United States Patent
Zhang et al.

(10) Patent No.: US 10,455,249 B2
(45) Date of Patent: Oct. 22, 2019

(54) DOWNSAMPLING PROCESS FOR LINEAR MODEL PREDICTION MODE

(71) Applicant: QUALCOMM Incorporated, San Diego, CA (US)

(72) Inventors: Li Zhang, San Diego, CA (US); Jianle Chen, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 98 days.

(21) Appl. No.: 15/073,171

(22) Filed: Mar. 17, 2016

(65) Prior Publication Data

US 2016/0277762 A1  Sep. 22, 2016

Related U.S. Application Data

(60) Provisional application No. 62/136,344, filed on Mar. 20, 2015.

(51) Int. Cl.

| | |
|---|---|
| *H04N 19/593* | (2014.01) |
| *H04N 19/117* | (2014.01) |
| *H04N 19/70* | (2014.01) |
| *H04N 19/80* | (2014.01) |
| *H04N 19/186* | (2014.01) |
| *H04N 19/44* | (2014.01) |
| *H04N 19/176* | (2014.01) |
| *H04N 19/167* | (2014.01) |
| *H04N 19/59* | (2014.01) |

(52) U.S. Cl.
CPC ......... *H04N 19/593* (2014.11); *H04N 19/117* (2014.11); *H04N 19/167* (2014.11); *H04N 19/176* (2014.11); *H04N 19/59* (2014.11)

(58) Field of Classification Search
CPC .... H04N 19/59; H04N 19/593; H04N 19/186; H04N 19/80; H04N 19/117
See application file for complete search history.

(56) References Cited

U.S. PATENT DOCUMENTS

| | | | |
|---|---|---|---|
| 2012/0328013 A1* | 12/2012 | Budagavi | H04N 19/105 375/240.12 |
| 2013/0136174 A1* | 5/2013 | Xu | H04N 19/105 375/240.12 |
| 2013/0188705 A1 | 7/2013 | Liu | |

FOREIGN PATENT DOCUMENTS

| | | |
|---|---|---|
| CN | 103918269 A | 7/2014 |
| CN | 104380741 A | 2/2015 |

OTHER PUBLICATIONS

International Preliminary Report on Patentability from corresponding PCT Application Serial No. PCT/US2016/023157 dated May 11, 2017 (18 pages).

(Continued)

*Primary Examiner* — Mainul Hasan
(74) *Attorney, Agent, or Firm* — Shumaker & Sieffert, P.A.

(57) ABSTRACT

Example techniques related to linear model (LM) prediction decoding or encoding are described. A video decoder or video encoder determines which filter to apply from a set of filters to downsample samples of a luma block and generate a predictive block for a corresponding chroma block based on characteristics of the chroma block.

47 Claims, 9 Drawing Sheets

(56) References Cited

OTHER PUBLICATIONS

Chiu et al., "CE6a: Modified Down-sampling Filter for LM Mode of Intra Chroma Prediction," JCT-VC Meeting; 98, MPEG Meeting; Nov. 21-20, 2011; Geneva; Joint Collaborative Team on Video Coding of ISO/IEC JTC1/SC29/WG11 and ITU-T SG.16; Retrieved from: http://wftp3.itu.int/av-arch/jctvc-site/ No. JCTVC-G172, Nov. 9, 2011m XP030110156, 6 pp.

Francois et al., "Use of Chroma Phase in LM Mode," JCT-VC Meeting; Mpeg Meeting; Apr. 27-May 7, 2012; Geneva; Joint Collaborative Team on Video Coding of ISO/IEC JTC1/SC29/WG11 and ITU-T SG.16; Retrieved from: http://wftp3.itu.int/av-arch/jctvc-site/, No. JCTVC-I0188, Apr. 16, 2012, XP030111951, 8 pp.

International Search Report and Written Opinion of International Application No. PCT/US2016/023157, dated Aug. 16, 2016, 19 pp.

Minezawa et al., "SCCE5 3.1.2: Extended Inter-component Prediction (JCTVC-Q0036)," JCT-VC Meeting; Jun. 30-Jul. 9, 2014; Sapporo; Joint Collaborative Team on Video Coding of ISO/IEC JTC1/SC29/WG11 and ITU-T SG.16; Retrieved from: http://wftp3.itu.int/av-arch/jctvc-site/No. JCTVC-R0072, Jun. 20, 2014, XP030116317, 20 pp.

Invitation to Pay Additional Fees and, Where Applicable, Protest Fee from International Application No. PCT/US2016/023157, dated Jun. 8, 2016, 9 pp.

Response to Written Opinion dated Aug. 16, 2016, from International Application No. PCT/US2016/023157, dated Jan. 13, 2017, 11 pp.

Second Written Opinion of International Application No. PCT/US2016/023157, dated Feb. 14, 2017, 8 pp.

Chen et al., "CE6.a.4: Chroma intra prediction by reconstructed luma samples", Joint Collaborative Team on Video Coding (JCT-VC) of ITU-T SG16 WP3 and ISO/IEC JTC1/SC29/WG11, JCTVC-E266, 5th Meeting: Geneva, Mar. 16-23, 2011, 10 pp.

Chiu et al., "Cross-channel techniques to improve intra chroma prediction", Joint Collaborative Team on Video Coding (JCT-VC) of ITU-T SG16 WP3 and ISO/IEC JTC1/SC29/WG11, JCTVC-F502, 6th Meeting: Torino, IT, Jul. 14-22, 2011, 6 pp.

Wang et al., "High Efficiency Video Coding (HEVC) Defect Report" Joint Collaborative Team on Video Coding (JCT-VC) of ITU-T SG 16 WP 3 and ISO/IEC JTC 1/SC 29/WG 11, JCTVC-N1003_v1, 14th Meeting: Vienna, AT, Jul. 25-Aug. 2, 2013, 312 pp.

Boyce et al., "Draft high efficiency video coding (HEVC) version 2, combined format range extensions (RExt), scalability (SHVC), and multi-view (MV-HEVC) extentions" Joint Collaborative Team on Video Coding (JCT-VC) of ITU-T SG 16 WP 3 and ISO/IEC JTC 1/SC 29/WG 11, JCTVC-R1013_v6, 14th Meeting: Vienna, AT, Jun. 30-Jul. 9, 2014, 545 pp.

Ford et al., "Colour space conversions," University of Westminster, London, Tech. Rep., Aug. 11, 1998, 31 pp.

Itu-T H.261, Line Transmission of Non-Telephone Signals, Video Codec for Audiovisual Services at p × 64 kbits, The International Telecommunication Union, Mar. 1993, 32 pp.

Itu-T H.262, Series H: Audiovisual and Multimedia Systems, Infrastructure of audiovisual services—Coding of moving video, Information technology—Generic coding of moving pictures and associated audio information: Video, The International Telecommunication Union, Feb. 2000, 211 pp.

Itu-T H.263, Series H: Audiovisual and Multimedia Systems, Infrastructure of audiovisual services—Coding of moving video, Video coding for low bit rate communication, The International Telecommunication Union, Jan. 2005, 226 pp.

Itu-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Itu-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Paila et al., "FLUTE—File Delivery over Unidirectional Transport," Network Working Group, RFC 6726, Internet Engineering Task Force (ITEF), Nov. 2012, Retrieved from the Internet: http://tools.ietf.org/html/rfc6726 on Feb. 10, 2017, 47 pp.

Sullivan et al., "Overview of the High Efficiency Video Coding (HEVC) Standard," IEEE Trans. Circuits and Systems for Video Technology, vol. 22, No. 12, Dec. 2012, pp. 1649-1668.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bossen, "Common test conditions and software reference configurations," JCT-VC Meeting; Jan. 14-23, 2013; (Joint Collaborative Team on Video Coding (JCT-VC) of ITU-T SG16 WP3 and ISO/IEC JTC1/SC29/WG11); No. JCTVC-L1100, 4 pp.

Tech et al., "3D-HEVC Draft Text 6," Joint Collaborative Team on 3D Video Coding Extensions of ITU-T SG 16 WP 3 and ISO/IEC JTC 1/SC 29/WG 11, Oct. 18-24, 2014, Document: JCT3V-I1001-v3, Oct. 29, 2014, 112 pp.

Tech, et al., "3D-HEVC Draft Text 6," JCT-3V Meeting; Oct. 18-24, 2014; (Joint Collaborative Team on Video Coding (JCT-VC) of ITU-T SG16 WP3 and ISO/IEC JTC1/SC29/WG11); document No. JCT3V-J1001_v6, Dec. 6, 2014; 99 pp.

Ye et al., "Improved H.264 intra coding based on bidirectional intra prediction, directional transform, and adaptive coefficient scanning," in Proc. 15th IEEE Int. Conf. Image Process, Oct. 2008, pp. 2116-2119.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.

* cited by examiner

Guide:

X = Location of luma sample

O = Location of chroma sample

DOWNSAMPLING PROCESS FOR LINEAR MODEL PREDICTION MODE

This application claims the benefit of U.S. Provisional Patent Application 62/136,344 filed Mar. 20, 2015, the entire content of which is incorporated herein by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized.

SUMMARY

This disclosure describes techniques related to linear model (LM) prediction decoding and encoding. When the color format is not 4:4:4 (i.e., luma and chroma components have different resolutions), in LM prediction, a predictive block for a chroma block is determined by downsampling a corresponding luma block based on a filter and applying alpha and beta parameters, described below, to the downsampled luma block. The techniques determine the filter that is to be applied for downsampling the luma block. For example, rather than there being one filter that is applied in all cases for downsampling the luma block, a video decoder or video encoder may dynamically determine which filter from a set of filters is to be applied. The determination of which filter is to be applied may be based on, for example, a characteristic of the chroma block such as a location of the chroma block relative to a boundary. In some examples, the techniques described here could also be applied to other coding methods where chroma is predicted from luma blocks and downsampling of luma block is needed.

In one example, the disclosure describes an example method of linear model (LM) prediction decoding video data, the method comprising determining a luma block of the video data that corresponds to a chroma block of the video data that is being decoded, determining a filter from a set of filters to apply to the luma block based on a characteristic of the chroma block, downsampling the luma block based on the determined filter, determining a predictive block based on the downsampled luma block, and reconstructing the chroma block based on the predictive block and a residual block.

In one example, the disclosure describes an example method of linear model (LM) prediction encoding video data, the method comprising determining a luma block of the video data that corresponds to a chroma block of the video data that is being encoded, determining a filter from a set of filters to apply to the luma block based on a characteristic of the chroma block, downsampling the luma block based on the determined filter, determining a predictive block based on the downsampled luma block, and generating a residual block based on the chroma block and the predictive block.

In one example, the disclosure describes an example device for linear model (LM) prediction decoding video data, the device comprising a video data memory configured to store the video data and a video decoder comprising integrated circuitry. The video decoder is configured to determine a luma block of the video data stored in the video data memory that corresponds to a chroma block of video data that is being decoded, determine a filter from a set of filters to apply to the luma block based on a characteristic of the chroma block, downsample the luma block based on the determined filter, determine a predictive block based on the downsampled luma block, and reconstruct the chroma block based on the predictive block and a residual block.

In one example, the disclosure describes an example device for linear model (LM) prediction encoding video data, the device comprising a video data memory configured to store the video data and a video encoder comprising integrated circuitry. The video encoder is configured to determine a luma block of the video data stored in the video data memory that corresponds to a chroma block of the video data that is being encoded, determine a filter from a set of filters to apply to the luma block based on a characteristic of the chroma block, downsample the luma block based on the determined filter, determine a predictive block based on the downsampled luma block, and generate a residual block based on the chroma block and the predictive block.

In one example, the disclosure describes an example device for linear model (LM) prediction decoding video data, the device comprising means for determining a luma block of the video data that corresponds to a chroma block of the video data that is being decoded, means for determining a filter from a set of filters to apply to the luma block based on a characteristic of the chroma block, means for downsampling the luma block based on the determined filter, means for determining a predictive block based on the downsampled luma block, and means for reconstructing the chroma block based on the predictive block and a residual block.

In one example, the disclosure describes an example device for linear model (LM) prediction encoding video data, the device comprising means for determining a luma block of the video data that corresponds to a chroma block of the video data that is being encoded, means for determining a filter from a set of filters to apply to the luma block based on a characteristic of the chroma block, means for downsampling the luma block based on the determined filter, means for determining a predictive block based on the downsampled luma block, and means for generating a residual block based on the chroma block and the predictive block.

In one example, the disclosure describes an example computer-readable storage medium storing instructions that when executed cause one or more processors of a device for linear model (LM) prediction decoding video data to determine a luma block of the video data that corresponds to a chroma block of the video data that is being decoded, determine a filter from a set of filters to apply to the luma block based on a characteristic of the chroma block, downsample the luma block based on the determined filter, determine a predictive block based on the downsampled luma block, and reconstruct the chroma block based on the predictive block and a residual block.

In one example, the disclosure describes an example computer-readable storage medium storing instructions that when executed cause one or more processors of a device for linear model (LM) prediction encoding video data to determine a luma block of the video data that corresponds to a chroma block of the video data that is being encoded, determine a filter from a set of filters to apply to the luma block based on a characteristic of the chroma block, downsample the luma block based on the determined filter, determine a predictive block based on the downsampled luma block, and generate a residual block based on the chroma block and the predictive block.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 4 is a conceptual diagram illustrating nominal vertical and horizontal relative locations of luma and chroma samples.

DETAILED DESCRIPTION

This disclosure describes techniques for video coding and compression of video data. In particular, this disclosure describes techniques for linear-model (LM) prediction video coding mode. Video coding in the LM prediction mode tends to reduce the inter component redundancy between luma and chroma samples of the video data. In the LM prediction video coding mode and when the sampling is not 4:4:4, a chroma block is predicted from a scaled, downsampled, reconstructed corresponding luma block (i.e., this scaled, downsampled, reconstructed corresponding luma block forms a predictive block used for predicting the chroma block).

In some examples, the downsampling of the reconstructed corresponding luma block includes filtering. This disclosure describes example ways in which to perform such filtering. The techniques described in this disclosure may also apply for situations where luma samples used in LM prediction mode are located in different tiles. The techniques described in this disclosure may be used in the context of advanced video codecs, such as extensions of the ITU-T H.265 high efficiency video coding (HEVC) video coding standard or the next generation, or future generations, of video coding standards.

Figure 1:
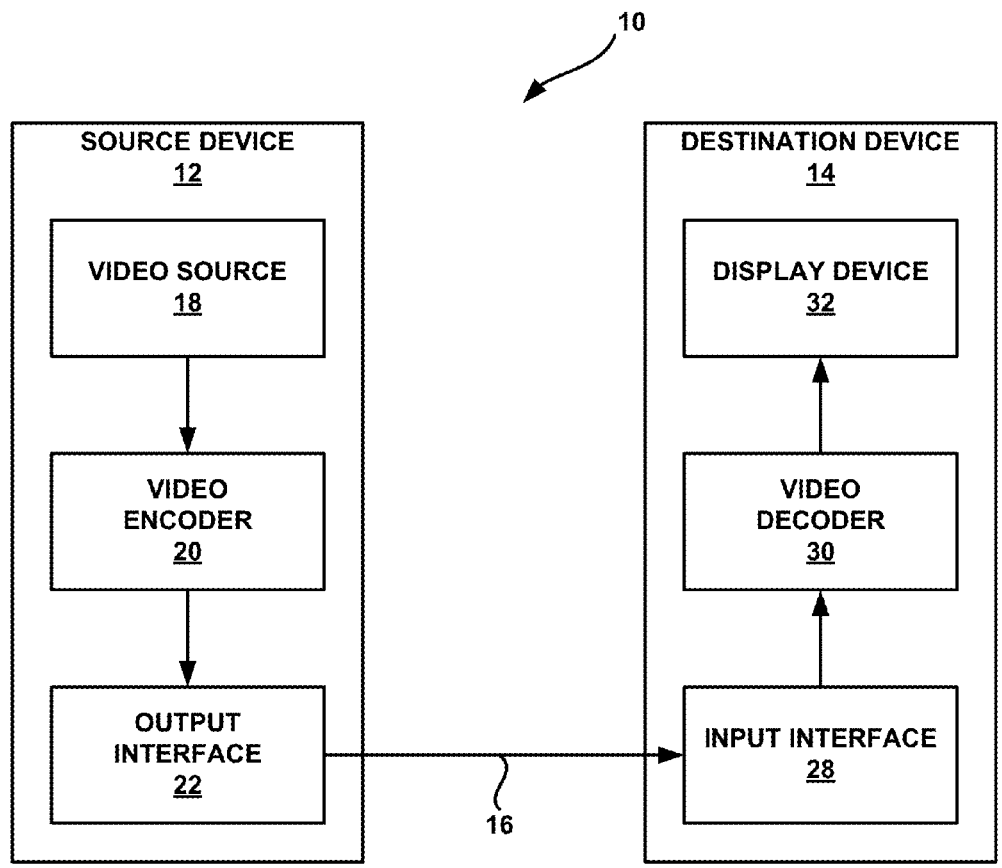
FIG. 1 is a block diagram illustrating an example video coding system that may utilize the techniques described in this disclosure.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for linear model (LM) prediction-based video coding in accordance with various examples described in this disclosure. For example, video encoder 20 and video decoder 30 may be configured to code a chroma block utilizing scaled, downsampled, reconstructed luma samples of a corresponding luma block, such as in examples where the sampling is not 4:4:4 (e.g., chroma is subsampled relative to luma) as described in this disclosure.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In some examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device (e.g., a video camera), a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard.

Examples video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a new video coding standard, namely High Efficiency Video Coding (HEVC), has recently been developed by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as HEVC WD hereinafter, is "High Efficiency Video Coding (HEVC) Defect Report" Wang et at. Joint Collaborative Team on Video Coding (JCT-VC) of ITU-T SG 16 WP 3 and ISO/IEC JTC 1/SC 29/WG 11 14$^{th}$ Meeting: Vienna, AT, 25 Jul.-2 Aug. 2013 and available from http://phenix.int-evey.fr/jct/doc_end_user/documents/14_Vienna/wg11/JCTVC-N1003-v1.zip. The specification of HEVC and its extensions including Format Range (RExt), Scalability (SHVC), and Multi-View (MV-HEVC) Extensions is "Draft high efficiency video coding (HEVC) version 2, combined format range extensions (RExt), scalability (SHVC), and multi-view (MV-HEVC) extentions" Boyce et al. Joint Collaborative Team on Video Coding (JCT-VC) of ITU-T SG 16 WP 3 and ISO/IEC JTC 1/SC 29/WG 11 14$^{th}$ Meeting: Vienna, AT, 30 Jun.-9 Jul. 2014 and available from http://phenix.int-evry.fr/jct/doc_end_user/documents/18_Sapporo/wg11/JCTVC-R1013-v6.zip.

Video coding may be performed based on color space and color format. For example, color video plays an essential role in multimedia systems, where various color spaces are used to efficiently represent color. A color space specifies color with numerical values using multiple components. A popular color space is the RGB color space, where color is represented as a combination of three primary color component values (i.e., red, green and blue). For color video compression, the YCbCr color space has been widely used, as described in A. Ford and A. Roberts, "Colour space conversions," University of Westminster, London, Tech. Rep., August 1998.

YCbCr can be easily converted from RGB color space via a linear transformation and the redundancy between different components, namely the cross component redundancy, is significantly reduced in the YCbCr color space. One advantage of YCbCr is the backward compatibility with black and white TV as Y signal conveys the luminance information. In addition, chrominance bandwidth can be reduced by subsampling the Cb and Cr components in 4:2:0 chroma sampling format with significantly less subjective impact than subsampling in RGB. Because of these advantages, YCbCr has been the major color space in video compression. There is also other color space, such as YCoCg, used in video compression. In this disclosure, regardless of the actual color space used, the Y, Cb, Cr is used to represent the three color components in the video compression scheme.

In 4:2:0 sampling, each of the two chroma arrays has half the height and half the width of the luma array. The nominal vertical and horizontal relative locations of luma and chroma samples in pictures are shown in FIG. 4.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks. A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction, inter prediction, or linear model (LM)-prediction, as a few examples, to generate (e.g., determine) the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate (e.g., determine) the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

In some examples, for a chroma block, rather than determining a predictive block for intra- or inter-prediction, video encoder 20 may determine a predictive block based on a reconstructed, corresponding luma block, for LM prediction mode. Video decoder 30 may similarly determine a predictive block based on a reconstructed corresponding luma block. The corresponding luma block refers to the luma block that was part of the unit (e.g., coding unit or prediction unit) from which the current chroma block was determined. Video encoder 20 may determine the residual between the chroma block and this predictive block generated from a reconstructed corresponding luma block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include an encoded representation of video data. For instance, the bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RB SP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a sequence parameter set (SPS), a second type of NAL unit may encapsulate an RBSP for a picture parameter set (PPS), a third type of NAL unit may encapsulate an RBSP for a coded slice, a fourth type of NAL unit may encapsulate an RB SP for SEI, and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use MVs of PUs to determine predictive blocks for the PUs of a current CU. As another example, for LM prediction mode, video decoder 30 may determine the predictive block for a chroma block based on reconstructed samples of a corresponding luma block. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU.

Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 and video decoder 30 may be configured to perform linear model (LM)-based coding. The following is a description of the LM-based prediction coding. For example, although the cross component redundancy is significantly reduced in YCbCr color space, correlation between three color components still exists. Various methods have been studied to improve the video coding performance by further reducing the correlation.

In 4:2:0 chroma video coding, a method named Linear Model (LM) prediction mode has been well studied, during development of the HEVC standard. See J. Chen, V. Seregin, W.-J. Han, J.-S. Kim, B.-M. Joen, "CE6.a.4: Chroma intra prediction by reconstructed luma samples", Joint Collaborative Team on Video Coding (JCT-VC) of ITU-T SG16 WP3 and ISO/IEC JTC1/SC29/WG11, JCTVC-E266, 5th Meeting: Geneva, 16-23 Mar., 2011, available from http://phenix.int-evry.fr/jct/doc_end_user/current_document.php?id=2196, and referred as JCTVC-E266 hereafter.

With LM prediction mode, the chroma samples are predicted based on reconstructed luma samples of the same block by using a linear model as follows:

$$\text{pred}_c(i,j) = \alpha * \text{rec}_L(i,j) + \beta \tag{1}$$

where $\text{pred}_c(i,j)$ represents the prediction of chroma samples in a block and $\text{rec}_L(i,j)$ represents the downsampled reconstructed luma samples of the same block. Parameters $\alpha$ and $\beta$ are derived from causal reconstructed samples around the current block. If the chroma block size is denoted by N×N, then both i and j are within the range [0, N).

Parameters α and β in equation (1) are derived by minimizing regression error between the neighboring reconstructed luma and chroma samples around the current block.

$$E(\alpha, \beta) = \sum_i (y_i - (\alpha \cdot x_i + \beta))^2 \quad (2)$$

And the parameters α and β are solved as follows $$\alpha = \frac{I \sum x_i \cdot y_i - \sum x_i \cdot \sum y_i}{I \sum x_i \cdot x_i - \sum x_i \cdot \sum x_i} \quad (3)$$

$$\beta = \left(\sum y_i - \alpha \cdot \sum x_i\right) / I \quad (4)$$

where $x_i$ is downsampled reconstructed Luma reference samples, $y_i$ is reconstructed Chroma reference samples, and I is the amount of the reference samples. For a target N×N chroma block, when both left and above causal samples are available, total involved samples number I is equal to 2N; when only left or above causal samples are available, total involved samples number I is equal to N.

Figure 5:
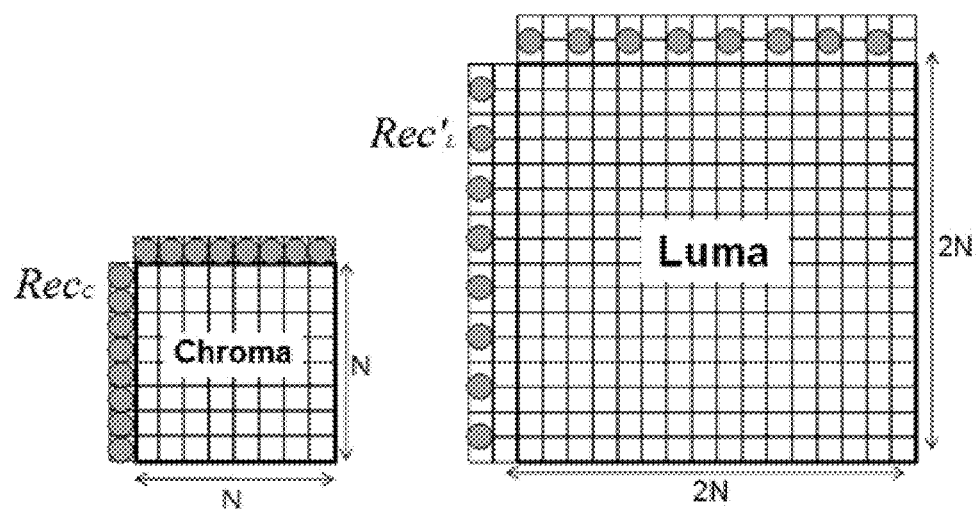
FIG. 5 is a conceptual diagram illustrating example locations from which scaling parameters used to scale a downsampled, reconstructed luma block are derived.

FIG. 5 is a conceptual diagram illustrating example locations from which scaling parameters used to scale the samples of the downsampled, reconstructed luma block are derived. For example, FIG. 5 illustrates an example of 4:2:0 sampling, and the scaling parameters are α and β.

In general, when LM prediction mode is applied, video encoder 20 and video decoder 30 may invoke the following steps. Video encoder 20 and video decoder 30 may downsample the neighboring luma samples. Video encoder 20 and video decoder 30 may derive the linear parameters (i.e., α and β) (also referred to as scaling parameters). Video encoder 20 and video decoder 30 may downsample the current luma block and derive the prediction (e.g., predictive block) from the downsampled luma block and linear parameters (i.e., scaling parameters).

There may be various ways in which to downsample. The following describes example ways in which downsampling may be performed.

In JCTVC-E266, as described above, when performing LM prediction mode, the downsampled current luma block and downsampled neighboring luma block are required. The downsampled current luma block is used to derive the prediction block for chroma coding while the downsampled neighboring luma block is used for derivation of parameters (i.e., α and β).

Since the typical sampling ratio of chroma components is half of that of luma component and has 0.5 sample phase difference in vertical direction in 4:2:0 sampling, reconstructed luma of current block is downsampled in vertical direction and subsampled in horizontal direction to match size and phase of the chroma signal, as follows:

$$rec_L(i,j) = (Rec_{LOrig}[2i,2j] + Rec_{LOrig}[2i,2j+1]) \gg 1 \quad (5)$$

wherein $Rec_{LOrig}[\ ]$ indicates the original reconstructed luma sample.

Figure 6:
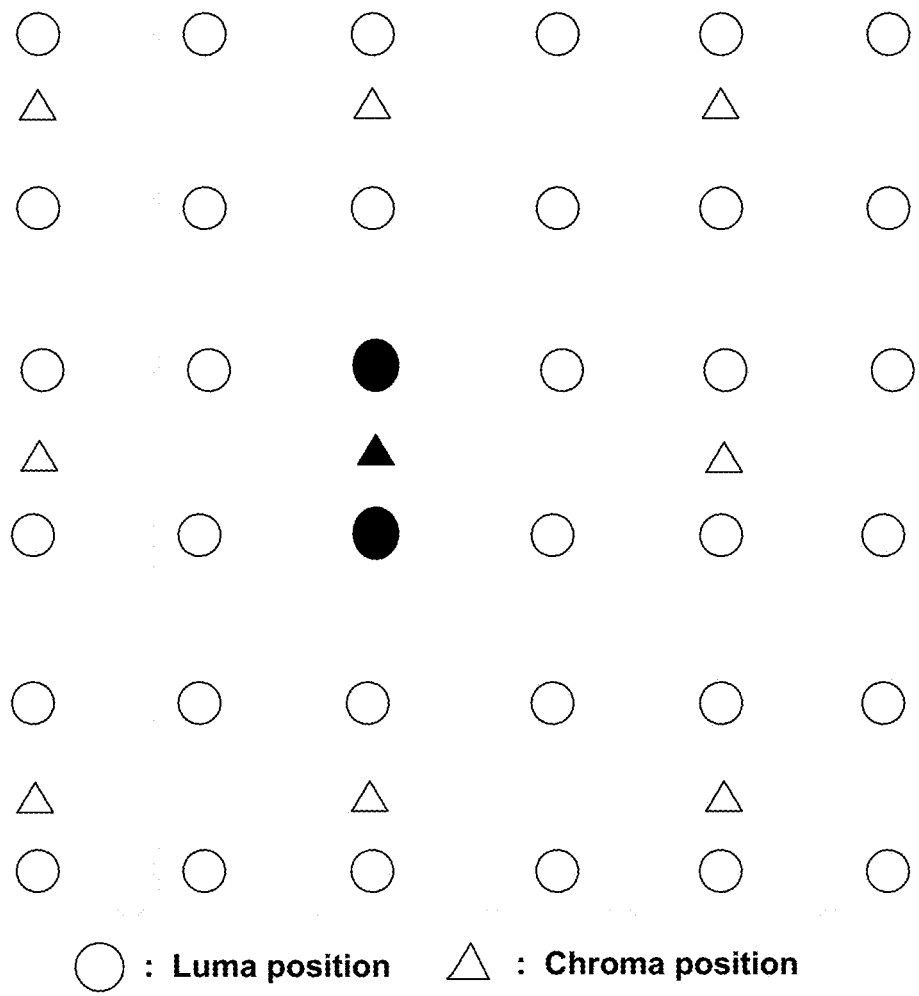
FIG. 6 is a conceptual diagram illustrating an example of luma positions and chroma positions for downsampling samples of a luma block for generating a predictive block.

FIG. 6 is a conceptual diagram illustrating an example of luma positions and chroma positions for downsampling samples of a luma block for generating a predictive block. As depicted in FIG. 6, a chroma sample, represented by the filled-in triangle, is predicted from two luma samples, represented by the two filled-in circles, by applying [1, 1] filter. The [1, 1] filter is one example of a 2-tap filter. In other words, to downsample a reconstructed luma block, equation (5) includes a built in [1, 1] 2-tap filter, as represented by $Rec_{LOrig}[2i, 2j]$ being one-tap and $Rec_{LOrig}[2i, 2j+1]$ being the other tap. A tap of the filter represents a value of input samples used for downsampling, where in equation (5), two values from the reconstructed luma block are added together and right-shifted to generate the downsampled luma block. Accordingly, as one example, video encoder 20 or video decoder 30 may perform the operations of equation (5) to determine the downsampled luma block.

For the downsampling of neighboring luma block, when the neighboring samples are on top of the current luma block, the downsampling process is defined as:

$$rec_L(i,-1) = Rec_{LOrig}[2i,-1] \quad (6)$$

When the neighboring samples are on the left of the current luma block, the downsampling process is defined as:

$$rec_L(-1,j) = (Rec_{LOrig}[-2,2j] + Rec_{LOrig}[-2,2j+1]) \gg 1 \quad (7)$$

The 2-tap filter, i.e., [1, 1], may be the same as what has been used in the example illustrated in FIG. 6. Accordingly, as one example, video encoder 20 or video decoder 30 may perform the operations of equations (6) and (7) to determine downsampled neighboring luma blocks that neighbor the luma block.

Other downsampling techniques have also been proposed. In Yi-Jen Chiu, Yu Han, Lidong Xu, Wenhao Zhang, Hong Jiang, "Cross-channel techniques to improve intra chroma prediction", Joint Collaborative Team on Video Coding (JCT-VC) of ITU-T SG16 WP3 and ISO/IEC JTC1/SC29/WG11, JCTVC-F502, 6th Meeting: Torino, IT, 14-22 Jul., 2011, available from http://phenix.int-evry.fr/jct/doc_en-d_user/current_document.php?id=2979, and referred to as JCTVC-F502, instead of using the two-tap filter, the 2-dimensional 6-tap filtering is applied to both the current luma block and the neighboring luma block. The 2-dimensional filter coefficient set is:

$$\begin{bmatrix} 1 & 2 & 1 \\ 1 & 2 & 1 \end{bmatrix} / 8 \quad (8)$$

The downsampled luma samples are derived by equation (9):

$$rec_L(i,j) = (Rec_{LOrig}[2i,2j]*2 + Rec_{LOrig}[2i,2j+1] + Rec_{LOrig}[2i,2j-1] + Rec_{LOrig}[2i+1,2j]*2 + Rec_{LOrig}[2i+1,2j+1] + Rec_{LOrig}[2i+1,2j-1]) \gg 3$$

For instance, video encoder 20 or video decoder 30 may perform the operations of equation (9) to determine the downsampled luma block. Equation (9) includes a built in 6-tap filter, as represented by [1, 2, 1; 1, 2, 1] with $Rec_{LOrig}[2i, 2j]$, $Rec_{LOrig}[2i, 2j+1]$, $Rec_{LOrig}[2i, 2j-1]$, $Rec_{LOrig}[2i+1, 2j]$, $Rec_{LOrig}[2i+1, 2j+1]$, and $Rec_{LOrig}[2i+1, 2j-1]$ as 6 input samples. A tap of the filter represents a number of input samples used for downsampling, where in equation (9), six values from the reconstructed luma block are used to generate the downsampled luma block.

Figure 7:
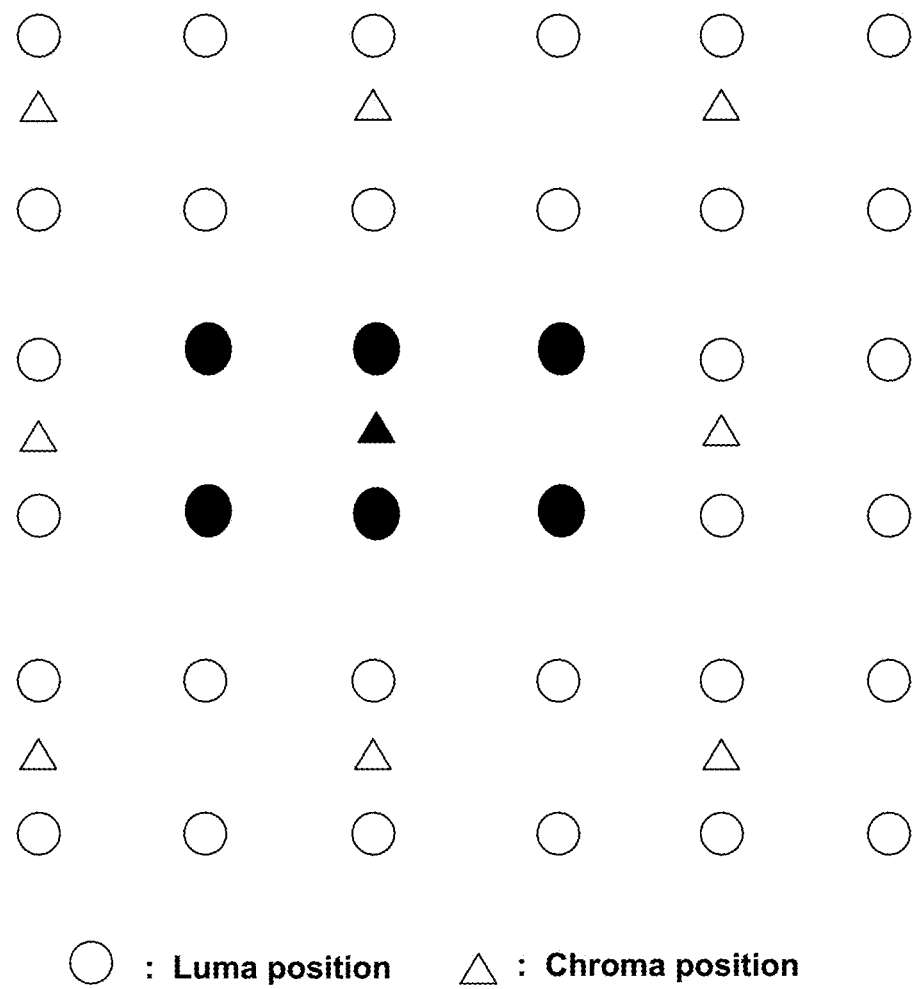
FIG. 7 is a conceptual diagram illustrating another example of luma positions and chroma positions for downsampling samples of a luma block for generating a predictive block.

FIG. 7 is a conceptual diagram illustrating another example of luma positions and chroma positions for downsampling samples of a luma block for generating a predictive block. As depicted in FIG. 7, a chroma sample, represented by the filled in triangle, is predicted from six luma samples, represented by the six filled in circles, by applying a 6-tap filter.

Since the predictor of one chroma sample is derived using the linear function, as defined in equation (1), it could be seen that when 6-tap filter is applied, the predictor of one chroma sample relies on the six neighboring luma samples. When combining equations (1) and (9), the result is the following equation (10):

$$pred_C(i,j) = \\ \alpha \cdot (Rec_{LOrig}[2i, 2j]*2 + Rec_{LOrig}[2i, 2j+1] + Rec_{LOrig}[2i, 2j-1] + \\ Rec_{LOrig}[2i+1, 2j]*2 + Rec_{LOrig}[2i+1, 2j+1] + \\ Rec_{LOrig}[2i+1, 2j-1]) >> 3) + \beta$$

In the following text, the downsampled sample $rec_L(i,j)$ is named as the corresponding downsampled luma sample for the chroma sample located at (i, j). For example, because of 4:2:0 sampling, a 2N×2N luma block corresponds to an N×N chroma block. With downsampling, the 2N×2N luma blocks becomes an N×N downsampled luma block. This N×N downsampled luma block is referred to as $rec_L(i,j)$ and corresponds to the N×N chroma block.

Furthermore, although the above examples are described with respect to 4:2:0 sampling, the techniques described in this disclosure are not so limited. For instance, the techniques described in this disclosure may also be applicable to 4:2:2 sampling. Accordingly, the examples with respect to 4:2:0 are provided merely as a way to assist with understanding.

Furthermore, in some examples, the techniques described in this disclosure may be applicable to 4:4:4 sampling as well. For example, in 4:4:4 sampling, the chroma block is not sub sampled relative to the luma block. However, it may be possible to determine a predictive block for the chroma block in such examples as well. For example, the luma block may be filtered and the filtered block may be used as a predictive block for the chroma block. In these examples, downsampling of the luma block may not be needed. As explained in more detail, the example techniques describe selection of a filter applied to samples of the luma block based on a location of the chroma block. The techniques for selecting a filter applied to samples of the luma block may be extended to examples where downsampling is not needed for LM prediction, such as for 4:4:4 sampling. In such examples, the filter may not include any downsampling so that the 4:4:4 sampling is preserved. Accordingly, the description for 4:2:0 sampling is an example, and the techniques are applicable to 4:4:4 sampling as well.

Moreover, in HEVC, the option to partition a picture into rectangular regions called tiles has been specified. The main purpose of tiles is to increase the capability for parallel processing rather than provide error resilience. Tiles are independently decodable regions of a picture that are encoded with some shared header information. Tiles can additionally be used for the purpose of spatial random access to local regions of video pictures. A typical tile configuration of a picture consists of segmenting the picture into rectangular regions with approximately equal numbers of CTUs in each tile. Tiles provide parallelism at a more coarse level of granularity (picture/subpicture), and no sophisticated synchronization of threads is necessary for their use.

There may exist certain issues/problems with techniques for LM prediction mode. For example, the downsampling process invoked in LM prediction mode is important for coding performance improvement. However, the fixed filters, such as the 2-tap filter and 6-tap filters, limit the coding performance. Different sequences or regions within one picture may have different characteristics, and the same filter applied to all the pictures may be sub-optimal. When the reconstructed luma samples used in LM prediction mode is located at a different tile, how to handle this case is unknown.

To resolve the problems mentioned above, the disclosure describes the following techniques. The techniques may apply individually, or any combination of them may apply. In general, video encoder 20 and video decoder 30 may perform these example techniques as part of encoding or decoding a chroma block in linear model (LM) prediction mode. For ease, the techniques are described with respect to a video coder, examples of which include video encoder 20 and video decoder 30.

For example, rather than being limited to using only a two-tap filter or a six-tap filter to downsample the luma block, a video coder (e.g., video encoder 20 or video decoder 30) may determine a filter from a set of filters that is used for downsampling the luma block. As an example, there may be a number X of different filters that the video coder can use for downsampling. For instance, there may be a one-tap filter, a two-tap filter, a three-tap filter, and so forth. Moreover, for each filter the specific taps might be different (e.g., the luma samples used for a first two-tap filter are different than the luma samples used for a second two-tap filter). In some of the examples described in this disclosure, the set of filters includes two filters; however, more than two filters from which the video coder determines which filter to apply for downsampling the luma block are possible.

The video coder may use various criteria by which the video coder determines the filter to apply. As one example, the video coder determines which filter from the set of filters to apply based on a location of the chroma block. If the chroma block borders a left boundary of the picture, CU, PU, or TU (e.g., the left boundary of the picture, CU, PU, or TU is the same as chroma block edge), the video coder may use a first filter for downsampling luma samples of the luma block that correspond to the chroma samples of the chroma block that are on the left boundary. Samples of the chroma block that are on the left boundary refer to the samples of the chroma block that are closest to the left boundary including samples that are directly on the boundary. The first filter may be applied to the N samples closest to the boundary (e.g., sample closest to the boundary, one next to that sample, and N such samples).

In some cases, the video coder may apply the first filter for all luma samples of the luma block, rather than just those samples that correspond to chroma samples that neighbor the left boundary; however, the techniques described in this disclosure are not so limited. For all other cases, the video coder may use a second, different filter for downsampling the luma block.

For instance, in 4:2:0 sampling, four luma samples correspond to one chroma sample. Accordingly, the video coder may determine which chroma sample corresponds to which luma samples. When filters with larger tap are used, one chroma sample may correspond to more than four luma samples. For the luma samples that correspond to a chroma sample on a left boundary (immediately adjacent or within a number of samples), the video coder may apply a first filter to the corresponding luma samples to downsample the luma block, and for the luma samples that correspond to a chroma sample that is not on a left boundary (not immediately adjacent or not within a number of samples), the video coder may apply a second filter to corresponding luma samples to downsample the luma block.

In some examples, the first filter may include fewer taps (e.g., number of samples that the filter extends over) than the second filter. As one example, the first filter is the two-tap filter and the second filter is the six-tap filter. In this example, the video coder may perform the operations of equation (5) to determine the downsampled luma samples of a luma block in the case that the corresponding chroma samples of the chroma block are on the left boundary, and may perform the operations of equation (9) to determine the downsampled luma samples of the luma block in the case that the corresponding chroma samples of the chroma block are not on the left boundary. Accordingly, during the derivation process of corresponding downsampled luma samples of chroma samples, the video coder may apply a different filter to the luma samples of a luma block that correspond to chroma samples of a chroma block located at the left picture boundary, or left boundary of coding unit (CU)/prediction unit (PU)/transform unit (TU), compared to the filter applied to other samples of the luma block that correspond to chroma samples that are not at the left picture boundary or left boundary of CU, PU, or TU. Chroma samples that are at the left boundary refer to chroma samples immediately adjacent to the left boundary or within a certain number of samples from the left boundary.

Using different filters allows the video coder to properly use available sample values. For instance, using a six-tap filter for luma samples that correspond to chroma samples at the left boundary of picture, CU, PU, or TU may result in requiring the video coder to use luma sample values that are not part of the luma block for downsampling and may result in the video coder having to perform some additional processing to address the lack of luma samples (e.g., padding luma sample values to generate values for samples that are not part of luma block). However, using a two-tap filter at the left boundary may not require the video coder to use luma sample values that are not part of the luma block for downsampling. Accordingly, although two-tap and six-tap filters are described, other sized filters for downsampling may be possible with consideration to avoid needing to require luma samples that are not part of the luma block (e.g., to avoid the need to pad luma samples on the left boundary).

As one example, during the derivation process of corresponding downsampled luma samples of chroma samples, the video coder applies a different filter to luma samples that correspond to chroma samples located at the left picture boundary compared to the filter applied to other luma samples that correspond to chroma samples not located at the left picture boundary. In one example, the length (e.g., tap) of the filter (i.e., the number of samples that the filter extends over) for deriving the corresponding downsampled luma samples of chroma samples at the left picture boundary is smaller than the length of the filter for deriving the corresponding downsample luma samples of chroma samples not at the left picture boundary (e.g., two-tap for the left boundary and six-tap for all others).

As one example, during the derivation process of corresponding downsampled luma samples of chroma samples, the video coder applies a different filter for luma samples of chroma samples located at the left CU boundary compared to the filter applied to other luma samples within current CU. In one example, the length (e.g., taps) of the filter (i.e., number of samples that the filter extends over) for deriving the corresponding downsampled luma samples of chroma samples at the left CU boundary is smaller than the length of the filter for deriving the corresponding downsample luma samples of chroma samples not at the left CU boundary (e.g., two-tap for the left boundary and six-tap for all others).

As one example, during the derivation process of corresponding downsampled luma samples of chroma samples, the video coder applies a different filter for chroma samples located at the left PU boundary compared to the filter applied to other samples within current PU. In one example, the length (e.g., taps) of the filter (i.e., the number of samples that the filter extends over) for deriving the corresponding downsampled luma samples of chroma samples at the left PU boundary is smaller than the length of the filter for deriving the corresponding downsample luma samples of chroma samples not at the left PU boundary (e.g., two-tap for the left boundary and six-tap for all others).

As one example, during the derivation process of corresponding downsampled luma samples of chroma samples, the video coder may apply a different filter for chroma samples located at the left TU boundary compared to the filter applied to other samples within current TU. In one example, the length (e.g., taps) of the filter (i.e., the number of samples that the filter extends over) for deriving the corresponding downsampled luma samples of chroma samples at the left TU boundary is smaller than the length of the filter for deriving the corresponding downsample luma samples of chroma samples not at the left TU boundary (e.g., two-tap for the left boundary and six-tap for all others).

In some cases, there may not be corresponding luma samples in the same picture. The following describes some example techniques to address such situations. For instance, although avoiding padding may be beneficial in some cases, in some instances, it may not be possible to avoid padding. For example, because some luma samples are unavailable (e.g., because off picture), the video coder may substitute padding sample values for these unavailable samples and perform downsampling with these padding sample values (e.g., downsample using the actual luma sample values for the available luma samples and padding sample values for the unavailable luma samples). The padding sample values may be default values (e.g., $2^{bitdepth}$ wherein bitdepth indicates the bit depth of luma component), values determined by video encoder 20 and signaled to video decoder 30, or values determined based on some implicit technique that does not require signaling of information. Adding padding sample values may reduce complexity because there may not be a need for separate filters.

During the derivation process of corresponding downsampled luma samples of chroma samples, when the luma samples are outside of a picture, or a CU/PU/TU needs to be involved in the downsampling process, the video coder may first apply a padding operation, followed by a downsampling process. In the padding of samples, the video coder may substitute those samples that are off screen with padding sample values.

As one example, during the derivation process of corresponding downsampled luma samples of chroma samples, the video coder may pad the luma samples (e.g., only the luma samples) which are located outside of the current picture. For all other positions, the reconstructed samples are used. As one example, during the derivation process of corresponding downsampled luma samples of chroma samples, the video coder may pad the luma samples which are located outside of the current CU. For all other positions, the reconstructed samples are used. As one example, during the derivation process of corresponding downsampled luma samples of chroma samples, the video coder may pad the luma samples which are located outside of the current PU. For all other positions, the reconstructed samples are used. As one example, during the derivation process of corresponding downsampled luma samples of chroma samples, the video coder may pad the luma samples which are located outside of the current TU. For all other positions, the reconstructed samples are used. In above examples for padding, the same downsampling process is applied to all positions.

When the position of luma reconstructed samples used in LM prediction mode is located outside current slice or current tile, the video coder may mark such samples as unavailable (e.g., the video coder may determine such samples as unavailable). When the sample is marked as unavailable, the video coder may perform one or more of the following.

It (e.g., the unavailable samples), if used in downsampling process for neighboring luma block, is not used in the downsampling process for neighboring luma block. Alternatively or additionally, the filter may be different from the filter used for other samples. It (e.g., the unavailable samples), if used in downsampling process for a current luma block, is not used in the downsampling process for a current luma block. Alternatively or additionally, the filter may be different from the filter used for other samples. It (e.g., the unavailable samples) is re-marked as available; however, the sample value is modified to be the padded sample value or a default value. Alternatively or additionally, the filter is kept the same as the filter used for other samples. In one example, the default value is dependent on the bit-depth. In another example, the padding could be from the left/right/above/below sample which is marked as available.

In general, for luma samples that are in another tile, the video coder may mark pixels outside the tile boundary as unavailable and not include them in the downsampling process. In some examples, the video coder may mark the luma samples in another tile as available but use padded pixels for such luma samples in another tile. As another example, the video coder may use padded "extended" values (e.g., one half possible value based on bit depth, so 8 bit, use 128) for luma samples in another tile, rather than marking the samples as unavailable.

In some examples, the video coder may enable one or more of the above example techniques under specific conditions. As one example, the condition may be dependent on the slice type (e.g., when the current slice is not an intra-coded slice, the video coder enables techniques in accordance with the examples described in this disclosure). Alternatively or additionally, the condition may be dependent on the coding type of its neighboring CU. For example, when the neighboring CU is inter coded, the video coder may enable one or more of the above techniques. Alternatively or additionally, the condition may be dependent on the reference pictures of the slice containing current CU/PU. For example, when all the reference pictures have smaller POC (Picture Order Count) values than the POC value of a current picture, the video coder may enable one or more of the above techniques.

In some examples, the video coder may apply different filters to different chroma color components (Cb or Cr). In some examples, when LM prediction mode is enabled, one or more sets of the downsampling filter may be further signaled in either a sequence parameter set (SPS), picture parameter set (PPS), or slice header. Alternatively or additionally, a Supplemental Enhancement Information (SEI) message syntax is introduced to describe the downsampling filter. Alternatively or additionally, furthermore, a default downsampling filter is defined, e.g., the 6-tap filter [1, 2, 1; 1, 2, 1] without signaling. Alternative or additionally, one PU/CU/largest CU may signal an index of the filter that is used in LM prediction mode. Alternatively or additionally, the usage of the filter tap may be derived on-the-fly by video decoder 30 without signaling. There may be other ways to provide filter support as well.

In some examples, instead of deriving the parameters of the linear model using the downsampled neighboring reconstructed luma samples, the video coder may use the original neighboring reconstructed luma samples to derive the parameters. In this case, the chroma prediction could be derived, as one example, with the following equation 11:

$$pred_C(i, j) = \alpha_0 * Rec_{LOrig}[2i, 2j] + \alpha_1 * Rec_{LOrig}[2i, 2j+1] +$$
$$\alpha_2 * Rec_{LOrig}[2i, 2j-1] + \alpha_3 * Rec_{LOrig}[2i+1, 2j] +$$
$$\alpha_4 * Rec_{LOrig}[2i+1, 2j+1] + \alpha_5 * Rec_{LOrig}[2i+1, 2j-1] + \beta$$

wherein the parameters ($\alpha_i$ (with i being 0 to 5, inclusive) and $\beta$) are obtained from the neighboring reconstructed luma and chroma blocks.

In one example, furthermore, a constraint is applied that $\alpha_i$ is equal to $\alpha_{(i+3)}$. In one example, furthermore, a constraint is applied that $\alpha_i$ is equal to $\alpha_{(i+2)}$ with i being equal to 0 or 3. In one example, this example technique may only be enabled for larger coded CUs, e.g., CU size larger than 16×16. In one example, one or more of the parameters is restricted to be 0.

Moreover, the video coder may apply one or more of the above techniques also for cross component residual prediction, in which the downsampled luma residual is used to predict the chroma residual. In this case, the downsampling process is applied to reconstructed luma residual, as one example.

The following is an example manner in which techniques described in this disclosure may be implemented by a video coder. The example implementation technique should not be considered limiting.

Below is an example for applying different downsampling processes for samples at the left picture boundary. The downsampling process for a current luma block is defined as follows:

if the chroma sample is not located at the left boundary of picture, 6-tap filter, e.g. [1 2 1; 1 2 1] is applied to derive the corresponding downsampled luma sample:

$rec_L(i,j)=(Rec_{LOrig}[2i,2j]*2+Rec_{LOrig}[2i,2j+1]+$
$Rec_{LOrig}[2i,2j-1]+Rec_{LOrig}[2i+1,2j]*2+Rec_{LOrig}$
$[2i+1,2j+1]+Rec_{LOrig}[2i+1,2j-1]+\text{offset0})>>3$ (12)

Otherwise, if the chroma sample is located at the left boundary of the picture, 2-tap filter, e.g., [1; 1] is applied to derive the corresponding downsampled luma sample:

$rec_L(i,j)=(Rec_{LOrig}[2i,2j]+Rec_{LOrig}[2i,2j+1]+$
$\text{offset1})>>1$ (13)

In one example, offset0 and offset1 are both set equal to 0. In another example, offset0 is set equal to 4 and offset1 is set equal to 1.

Figure 2:
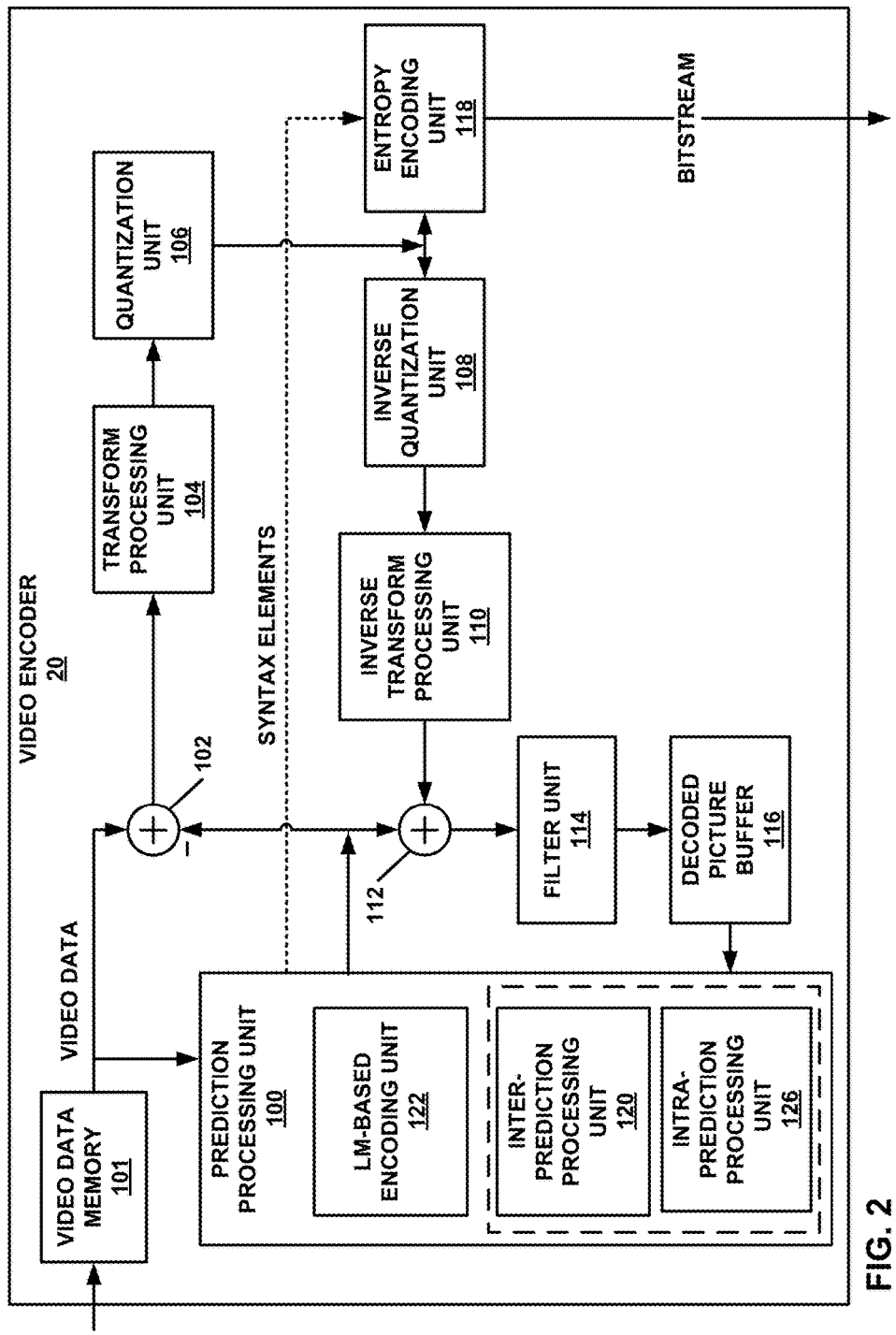
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 includes processing circuitry, and video encoder 20 is configured to perform one or more of the example techniques described in this disclosure. For instance, video encoder 20 includes integrated circuitry, and the various units illustrated in FIG. 2 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 2 may be provided by software units executing on the processing circuitry. In such examples, the object code for these software units is stored in memory. An operating system may cause video encoder 20 to retrieve the object code and execute the object code, which causes video encoder 20 to perform operations to implement the example techniques. In some examples, the software units may be firmware that video encoder 20 executes at startup. Accordingly, video encoder 20 is a structural component having hardware that performs the example techniques or has software/firmware executing on the hardware to specialize the hardware to perform the example techniques.

Video encoder 20 represents an example of a device that may be configured to perform techniques for LM-based video coding in accordance with various examples described in this disclosure. For example, video encoder 20 may be configured to encode one or more blocks using LM video encoding.

In the example of FIG. 2, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). Video encoder 20 also includes a linear model (LM)-based encoding unit 122 configured to perform various aspects of the LM-based coding techniques described in this disclosure. In other examples, video encoder 20 may include more, fewer, or different components.

Video data memory 101 may store video data to be encoded by the components of video encoder 20. The video data stored in video data memory 101 may be obtained, for example, from video source 18. Decoded picture buffer 116 may be a reference picture memory that stores reference video data for use in encoding video data by video encoder 20 (e.g., in intra- or inter-coding modes). Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 20, or off-chip relative to those components.

Video encoder 20 may receive video data. Video encoder 20, via prediction processing unit 100, may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive blocks of the PU based on actual or interpolated samples at the reference location indicated by the motion vector of the PU.

If a PU is in a B slice, the motion estimation unit of inter-prediction processing unit 120 may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a prediction block of the PU and a reference location associated with the reference region, and one or more prediction direction indicators that indicate whether the reference picture is in RefPicList0 or RefPicList1. The motion compensation unit of inter-prediction processing unit 120 may generate the predictive blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit of inter-prediction processing unit 120 may generate the predictive blocks of the PU based at least in part on actual or interpolated samples at the reference regions indicated by the motion vectors of the PU.

LM-based encoding unit 122 may perform the linear model (LM) prediction encoding. For example, LM-based encoding unit 122 may downsample reconstructed luma samples of a luma block that corresponds to a current chroma block that is being encoded. For example, in 4:2:0 sampling, four luma samples correspond to one chroma block. The four luma samples that form a 2×2 block in the top left corner of the luma picture correspond to the one chroma sample located at the top left corner of the chroma picture. LM-based encoding unit 122 may scale the downsampled reconstructed luma samples of the luma block to generate a predictive block. Residual generation unit 102 may determine a residual block between the chroma block and the predictive block. In some examples, LM-based encoding unit 122 may apply such techniques as part of cross-component residual prediction. In this case, the chroma block is a chroma residual block and the luma block is a luma residual block.

In the techniques described in this disclosure, LM-based encoding unit 122 may implement one or more of the above example techniques as part of the downsampling of the luma samples of a luma block. For instance, LM-based encoding unit 122 may apply different filters for downsampling the corresponding luma block based on characteristics of the chroma block being encoded. Examples of the characteristics of the chroma block being decoded include the position of the chroma block being decoded. As another example, LM-based encoding unit 122 may apply padding to the luma block based on luma samples being outside of a particular boundary (e.g., picture, CU, PU, or TU).

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs, the predictive data generated by intra-prediction processing unit 126 for the PUs, or the predictive data generated by LM-based encoding unit 122. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding block of a CU and the selected predictive luma, Cb and Cr blocks of the PUs of the CU, luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU. Moreover, LM-based encoding unit 122 may utilize reconstructed luma blocks in decoded picture buffer 116 for linear model (LM) prediction encoding a chroma block (where the luma block may include video data in some examples or may be a residual luma block and the chroma block may include video data in some examples or may be a residual chroma block).

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a Context-Adaptive Binary Arithmetic Coding (CABAC) operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

The example of FIG. 2 of this disclosure describes video encoder 20 configured to determine a corresponding luma block for a chroma block that is being encoded, determine a filter to apply to the luma block based on a characteristic of the chroma block, downsample the luma block based on the determined filter, determine a predictive block based on the downsampled luma block, and linear model (LM) prediction encode the chroma block based on the predictive block. For example, LM-based encoding unit 122 may perform the example operations to LM prediction encode a chroma block.

LM-based encoding unit 122 may determine a luma block of video data that corresponds to a chroma block of video data that is being encoded. Prediction processing unit 100 may be configured to track which luma block and chroma blocks correspond to one another such as during the dividing of a picture into CTUs, CUs, and PUs.

LM-based encoding unit 122 determines a filter from a set of filters to apply to the luma block based on a characteristic of the chroma block. For example, LM-based encoding unit 122 may determine a location of the chroma block relative to a boundary of the picture, CU, PU, or TU. Because prediction processing unit 100 divided the pictures into the CTUs, CUs, and PUs, LM-based encoding unit 122 may determine the location of the chroma block relative to the picture, CU, PU, or TU.

LM-based encoding unit 122 determines to apply a first filter to luma samples of the luma block that correspond to chroma samples of the chroma block that are located at a boundary. Accordingly, based on the chroma samples being located at a boundary, LM-based encoding unit 122 may determine to apply a first filter to corresponding luma samples (e.g., equation (12)). LM-based encoding unit 122 determines to apply a second, different filter to luma samples of the luma block that correspond to chroma samples of the chroma block that are not located at the boundary. Accordingly, based on the chroma samples not being located at a boundary, LM-based encoding unit 122 may determine to apply a second filter, different from the first filter, to corresponding luma samples of the luma block (e.g., equation (13)).

LM-based encoding unit 122 retrieves the reconstructed luma block from DPB 116 and downsamples the luma block based on the determined filter. The downsampled luma block is referred to as: $rec_L(i,j)$. For example, if the chroma samples are at the left boundary, LM-based encoding unit 122 performs downsampling of the luma samples using a two-tap filter (e.g., the operations of equation (12)). If the chroma samples are not at the left boundary, LM-based encoding unit 122 performs downsampling of the luma samples using a six-tap filter (e.g., the operations of equation (13)). In general, in the first filter includes fewer taps than the second filter.

From the downsampled luma block, LM-based encoding unit 122 determines a predictive block. For example, LM-based encoding unit 122 may perform the operations of equation 1. For determining the predictive block, LM-based encoding unit 122 determines values for $\alpha$ and $\beta$. LM-based encoding unit 122 may perform the operations of equations 2-4 to determine the $\alpha$ and $\beta$ values. With the $\alpha$ and $\beta$ values, LM-based encoding unit 122 scales $rec_L(i,j)$ as per equation 1 and determines the predictive block.

In determining the $\alpha$ and $\beta$ values, LM-based encoding unit 122 may downsample one or more neighboring luma blocks (e.g., performing the operations of equations (6) and (7)) and determine the first parameter (e.g., $\alpha$) and second parameter (e.g., $\beta$) based on the downsampled neighboring luma blocks for the one or more neighboring chroma blocks. However, downsampling of neighboring blocks is not needed in every example. For instance, LM-based encoding unit 122 may perform the operations of equation (11).

In some examples, LM-based encoding unit 122 may determine which downsampling filter to apply based on the type of chroma block. For example, in one instance of the chroma block being of a first type (e.g., Cr or Cb), LM-based encoding unit 122 may determine to apply a first filter to the luma block based on the chroma block being of the first type. In another instance of the chroma block being of a second type (e.g., other one of Cr or Cb), LM-based encoding unit 122 may determine to apply a second, different filter (i.e., different from the first filter) to the luma block based on the chroma block being of the second type. The filters that LM-based encoding unit 122 selects for the first and second type of chroma blocks may also be based on the location of the chroma samples relative to a boundary, but not necessarily in every example.

As described above, in some examples, LM-based encoding unit 122 may determine that luma samples of the luma block are outside one or more of a picture, slice, a CU, a PU, or a TU. In such examples, LM-based encoding unit 122 may replace the luma sample values for the one or more luma samples that are outside with padding values. For instance, LM-based encoding unit 122 may be pre-configured or the padding values may be stored in video data memory 101. LM-based encoding unit 122 may replace the luma samples that are outside with these padding values and store the resulting luma block in video data memory 101. LM-based encoding unit 122 may then downsample the luma block having the padding values (e.g., perform equation (5) or (9)).

The disclosure also describes video encoder 20 configured to determine a corresponding luma block for a chroma block that is being encoded, based on the luma block extending beyond a boundary, apply padding to a portion of the luma block that extends beyond the boundary and maintains reconstructed samples for the remainder of the luma block to generate a padded luma block, downsamples the padded luma block, determines a predictive block based on the downsampled padded luma block, and linear model (LM) prediction encodes the chroma block based on the predictive block.

Although the above example techniques have been described with respect to luma block being a block of luma samples, the techniques described in this disclosure are not so limited. In some examples, the luma block is a luma residual block, meaning that luma block represents the difference between a block of luma samples and a predictive block of luma samples. This luma residual block may be used to generate a predictive chroma residual block for a corresponding chroma residual block. LM-based encoding unit 122 may perform similar functions on the luma residual block to generate a predictive chroma residual block for a chroma residual block. For example, for cases where the luma block is a luma residual block, LM-based encoding unit 122 may downsample the luma residual block to generate a predictive chroma residual block using techniques similar to those described above with respect to examples where the luma block is a block of luma samples. Such techniques may be applicable to both 4:2:0 and 4:2:2 sampling using the example downsampling filters described above (and possibly for 4:4:4 with filtering, but not necessary downsampling).

The examples techniques described above with respect to LM-based encoding unit 122 may be applicable under specific conditions, although this is not a requirement for every case. For instance, if the current slice is not an intra-coded slice, then LM-based encoding unit 122 may perform chroma prediction. As another example, if a neighboring CU is inter-coded, LM-based encoding unit 122 may perform chroma prediction. As another example, if reference pictures in RefPicList0 and/or RefPicList1 have POC values smaller than the POC value of the current picture, then LM-based encoding unit 122 may perform chroma prediction. However, these conditions are described merely as examples. It may be possible for LM-based encoding unit 122 to perform chroma prediction in all cases, and whether chroma prediction is performed based on LM-based encoding unit 122 is ultimately decided based on which coding provides optimum video coding.

LM-based encoding unit 122 may output the predictive block to residual generation unit 102. Residual generation unit 102 generates a residual block from the predictive block and the chroma block. The resulting residual block is transformed by transform processing unit 103, quantized by quantization unit 106, and entropy encoded by entropy encoding unit 118. The result is then signaled via a bitstream and video decoder 30 uses information in the bitstream to reconstruct the chroma block.

Figure 3:
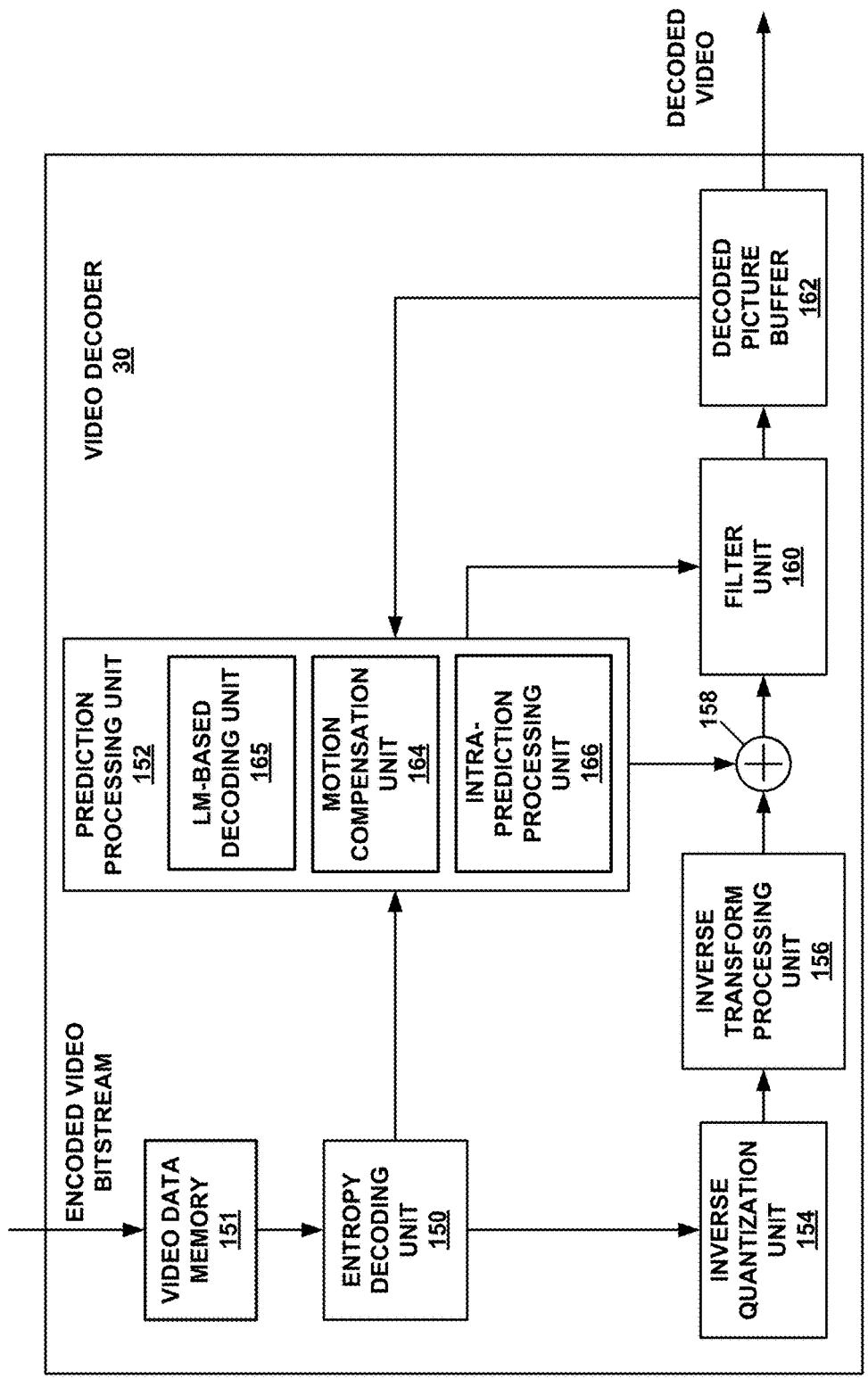
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video decoder 30 includes processing circuitry, and video decoder 30 is configured to perform one or more of the example techniques described in this disclosure. For instance, video decoder 30 includes integrated circuitry, and the various units illustrated in FIG. 3 may be formed as hardware circuit blocks that are interconnected with a circuit bus. These hardware circuit blocks may be separate circuit blocks or two or more of the units may be combined into a common hardware circuit block. The hardware circuit blocks may be formed as combination of electric components that form operation blocks such as arithmetic logic units (ALUs), elementary function units (EFUs), as well as logic blocks such as AND, OR, NAND, NOR, XOR, XNOR, and other similar logic blocks.

In some examples, one or more of the units illustrated in FIG. 3 may be provided by software units executing on the processing circuitry. In such examples, the object code for these software units is stored in memory. An operating system may cause video decoder 30 to retrieve the object code and execute the object code, which causes video decoder 30 to perform operations to implement the example techniques. In some examples, the software units may be firmware that video decoder 30 executes at startup. Accordingly, video decoder 30 is a structural component having hardware that performs the example techniques or has software/firmware executing on the hardware to specialize the hardware to perform the example techniques.

Video decoder 30 represents an example of a device that may be configured to perform techniques for LM-based video coding in accordance with various examples described in this disclosure. For example, video decoder 30 may be configured to decode one or more blocks utilizing an LM video coding mode (i.e., to linear model (LM) prediction decode one or more blocks).

In the example of FIG. 3, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Video decoder 30 also includes a linear model (LM)-based decoding unit 165 configured to perform various aspects of the LM-based coding techniques described in this disclosure. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from computer-readable medium 16 (e.g., from a local video source, such as a camera, via wired or wireless network communication of video data, or by accessing physical data storage media). Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components.

A coded picture buffer (CPB) may receive and store encoded video data (e.g., NAL units) of a bitstream. Entropy decoding unit 150 may receive encoded video data (e.g., NAL units) from the CPB and parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in decoded picture buffer 162, intra prediction or inter prediction operations on PUs of other CUs.

In accordance with various examples of this disclosure, video decoder 30 may be configured to perform LM-based coding. LM-based decoding unit 165 may perform the linear model (LM) prediction decoding. For example, LM-based decoding unit 165 may downsample reconstructed luma samples of a luma block that corresponds to a current chroma block that is being decoded. LM-based decoding unit 165 may scale the downsampled reconstructed luma samples of the luma block to generate a predictive block for the chroma block. Reconstruction unit 158 may then add the generated predictive block to the decoded residual data. In some examples, LM-based decoding unit 165 may apply such techniques as part of cross-component residual prediction. In this case, the chroma block is a chroma residual block and the luma block is a luma residual block.

In the techniques described in this disclosure, LM-based decoding unit 165 may implement one or more of the above example techniques as part of the downsampling of the luma samples of a luma block. For instance, LM-based decoding unit 165 may apply different filters for downsampling the corresponding luma block based on characteristics of the chroma block being decoded. Examples of the characteristics of the chroma block being decoded include the position of the chroma block being decoded. As another example, LM-based decoding unit 165 may apply padding to the luma block based on luma samples being outside of a particular boundary (e.g., picture, slice, CU, PU, or TU).

In this manner, the disclosure describes video decoder 30 configured to determine a corresponding luma block for a chroma block that is being decoded, determine a filter to apply to the luma block based on a characteristic of the chroma block, downsample the luma block based on the determined filter, determine a predictive block based on the downsampled luma block, and linear model (LM) prediction decode the chroma block based on the predictive block.

The disclosure also describes video decoder 30 configured to determine a corresponding luma block for a chroma block that is being decoded, based on the luma block extending beyond a boundary, apply padding to a portion of the luma block that extends beyond the boundary and maintains reconstructed samples for the remainder of the luma block to generate a padded luma block, downsample the padded luma block, determine a predictive block based on the downsampled padded luma block, and linear model (LM) prediction decode the chroma block based on the predictive block.

LM-based decoding unit 165 may determine a luma block of video data that corresponds to a chroma block of video data that is being decoded. Prediction processing unit 152 tracks which luma block and chroma blocks correspond to one another based on syntax elements that video encoder 20 signals in the bitstream.

LM-based decoding unit 165 determines a filter from a set of filters to apply to the luma block based on a characteristic of the chroma block. For example, LM-based decoding unit 165 may determine a location of the chroma block relative to a boundary of the picture, slice, CU, PU, or TU. Because the bitstream indicated how the pictures were divided into the CTUs, CUs, and PUs, LM-based decoding unit 165 may determine the location of the chroma block relative to the picture, CU, PU, or TU.

LM-based decoding unit 165 determines to apply a first filter to luma samples of the luma block that correspond to chroma samples of the chroma block that are located at a boundary. Accordingly, based on the chroma samples being located at a boundary, LM-based decoding unit 165 may determine to apply a first filter to the corresponding luma samples (e.g., equation (12)). LM-based decoding unit 165 determines to apply a second, different filter to the luma samples of the luma block that correspond to chroma samples of the chroma block that are not located at the boundary. Accordingly, based on the chroma samples not being located at a boundary, LM-based decoding unit 165 may determine to apply a second filter, different from the first filter, to the corresponding luma samples (e.g., equation (13)).

LM-based decoding unit 165 retrieves the reconstructed luma block from DPB 162 and downsamples the luma block based on the determined filter. The downsampled luma block is referred to as: $rec_L(i,j)$. For example, if the chroma samples are at the left boundary, LM-based decoding unit 165 performs downsampling using a two-tap filter (e.g., the operations of equation (12)). If the chroma samples are not at the left boundary, LM-based decoding unit 165 performs downsampling using a six-tap filter (e.g., the operations of equation (13)). In general, in the first filter includes fewer taps than the second filter.

From the downsampled luma block, LM-based decoding unit 165 determines a predictive block. For example, LM-based decoding unit 165 may perform the operations of equation (1). For determining the predictive block, LM-based decoding unit 165 determines values for α and β. LM-based decoding unit 165 may perform the operations of equations 2-4 to determine the α and β values. With the α and β values, LM-based decoding unit 165 scales $rec_L(i,j)$ as per equation (1) and determines the predictive block.

In determining the α and β values, LM-based decoding unit 165 may downsample one or more neighboring luma blocks (e.g., performing the operations of equations (6) and (7)) and determine the first parameter (e.g., α) and second parameter (e.g., β) based on the downsampled neighboring luma blocks for the one or more neighboring chroma blocks. However, downsampling of neighboring blocks is not needed in every example. For instance, LM-based decoding unit 165 may perform the operations of equation (11).

In some examples, LM-based decoding unit 165 may determine which downsampling filter to apply based on the type of chroma block. For example, in one instance of the chroma block being of a first type (e.g., Cr or Cb), LM-based decoding unit 165 may determine to apply a first filter to the luma block based on the chroma block being of the first type. In another instance of the chroma block being of a second type (e.g., other one of Cr or Cb), LM-based decoding unit 165 may determine to apply a second, different filter to the luma block based on the chroma block being of the second type. The filters that LM-based decoding unit 165 selects for the first and second type of chroma blocks may also be based on the location of the chroma samples relative to a boundary, but not necessarily in every example.

As described above, in some examples, LM-based decoding unit 165 may determine that luma samples of the luma block are outside one or more of a picture, a slice, a CU, a PU, or a TU. In such examples, LM-based decoding unit 165 may replace the luma sample values for the one or more luma samples that are outside with padding values. For instance, LM-based decoding unit 165 may be pre-configured or the padding values may be stored in video data memory 151. LM-based decoding unit 165 may replace the luma samples that are outside with these padding values and store the resulting luma block in video data memory 151. LM-based decoding unit 165 may then downsample the luma block having the padding values (e.g., perform equation (5) or (9)).

Although the above example techniques have been described with respect to a luma block being a block of luma samples, the techniques described in this disclosure are not so limited. In some examples, the luma block is a luma residual block, meaning that luma block represents the difference between a block of luma samples and a predictive block of luma samples. This luma residual block may be used to generate a predictive chroma residual block for a corresponding chroma residual block. LM-based decoding unit 165 may perform similar functions on the luma residual block to generate a predictive chroma residual block for a chroma residual block. For example, for cases where the luma block is a luma residual block, LM-based decoding unit 165 may downsample the luma residual block to generate a predictive chroma residual block using techniques similar to those described above with respect to examples where the luma block is a block of luma samples. Such techniques may be applicable to both 4:2:0 and 4:2:2 sampling using the example downsampling filters described above (and possibly for 4:4:4 with filtering, but not necessary downsampling).

The examples techniques described above with respect to LM-based decoding unit 165 may be applicable under specific conditions, although this is not a requirement for every case. For instance, if the current slice is not an intra-coded slice, then LM-based decoding unit 165 may perform chroma prediction. As another example, if a neighboring CU is inter-coded, LM-based decoding unit 165 may perform chroma prediction. As another example, if reference pictures in RefPicList0 and/or RefPicList1 have POC values smaller than the POC value of the current picture, then LM-based decoding unit 165 may perform chroma prediction. However, these conditions are described merely as examples. It may be possible for LM-based decoding unit 165 to perform chroma prediction in all cases, and whether chroma prediction is performed based on LM-based decoding unit 165 may be ultimately decided based on which coding provides optimum video coding.

LM-based decoding unit 152 may output the predictive block to reconstruction unit 158. Reconstruction unit 158 also receives a residual block (e.g., after information in the bitstream for the residual block is entropy decoded with entropy decoding unit 150, inverse quantized with inverse quantization unit 154, inverse transformed with inverse transform processing unit 156). Reconstruction unit 158 adds the residual block with the predictive block to reconstruct the chroma block.

Figure 8:
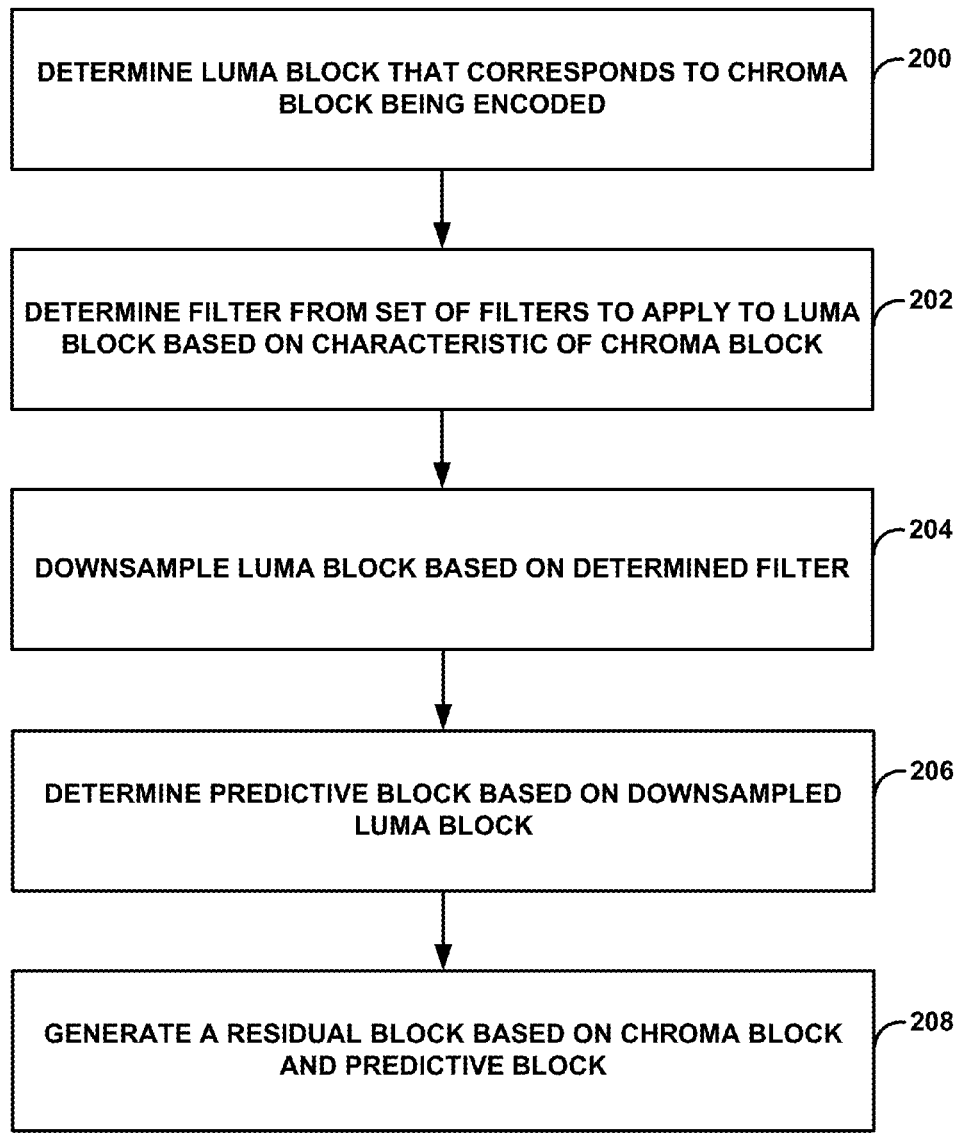
FIG. 8 is a flowchart illustrating one example technique of linear model (LM) prediction encoding video data.

FIG. 8 is a flowchart illustrating one example technique of linear model (LM) prediction encoding video data. As illustrated, LM-based encoding unit 122 determines a luma block of video data that corresponds to a chroma block of video data that is being encoded (200). For example, prediction processing unit 100 divides a picture into CTUs, CUs, and PUs, and constructs the luma blocks and the chroma blocks for storage in video data memory 101, from which LM-based encoding unit 122 can determine which luma block corresponds to which chroma block. In addition, based on the determination of which luma block corresponds to which chroma block, LM-based encoding unit 122 may also determine which luma samples of the luma block correspond to which chroma samples of the chroma block. For instance, in 4:2:0 sampling, four luma samples correspond to one chroma sample.

LM-based encoding unit 122 determines a filter from a set of filters to apply to the luma block based on a characteristic of the chroma block (202). For example, LM-based encoding unit 122 determines to apply a first filter (e.g., two-tap filter) to luma samples of the luma block that correspond to chroma samples of the chroma block that are located at a boundary (e.g., left boundary) of a picture, slice, CU, PU, or TU. LM-based encoding unit 122 determines to apply a second filter (e.g., six-tap filter) to luma samples of the luma block that correspond to chroma samples of the chroma block that are not located at the boundary.

LM-based encoding unit 122 downsamples the luma block based on the determined filter (204). For example, to downsample the luma block based on the determined filter, LM-based encoding unit 122 may perform the operations of equation 12 for luma samples of the luma block that correspond to a chroma sample of the chroma block that is at a boundary (e.g., left boundary) of a picture, slice, CU, PU, or TU, and perform the operations of equation 13 for luma samples of the luma block that correspond to a chroma sample of the chroma block that is not at the boundary of the picture, slice, CU, PU, or TU.

LM-based encoding unit 122 may determine a predictive block based on the downsampled luma block (206). For example, LM-based encoding unit 122 may downsample one or more neighboring luma blocks that neighbor the luma block. However, downsampling of neighboring blocks may not be needed in all examples. LM-based encoding unit 122 may determine a first parameter ($\alpha$) and a second parameter ($\beta$) based on the downsampled one or more neighboring luma blocks and one or more neighboring chroma blocks that neighbor the chroma block being encoded. LM-based encoding unit 122 may determine the predictive block based on the downsampled luma block and the first parameter and the second parameter (e.g., by performing the operations of equation (1)).

Video encoder 20 generates a residual block based on the chroma block and the predictive block (208). For example, residual generation unit 102 determines a residual between the chroma block and the predictive block and this residual block is transformed, quantized, and entropy encoded. Video encoder 20 signals information indicative of the residual block that video decoder 30 uses to reconstruct the chroma block.

Figure 9:
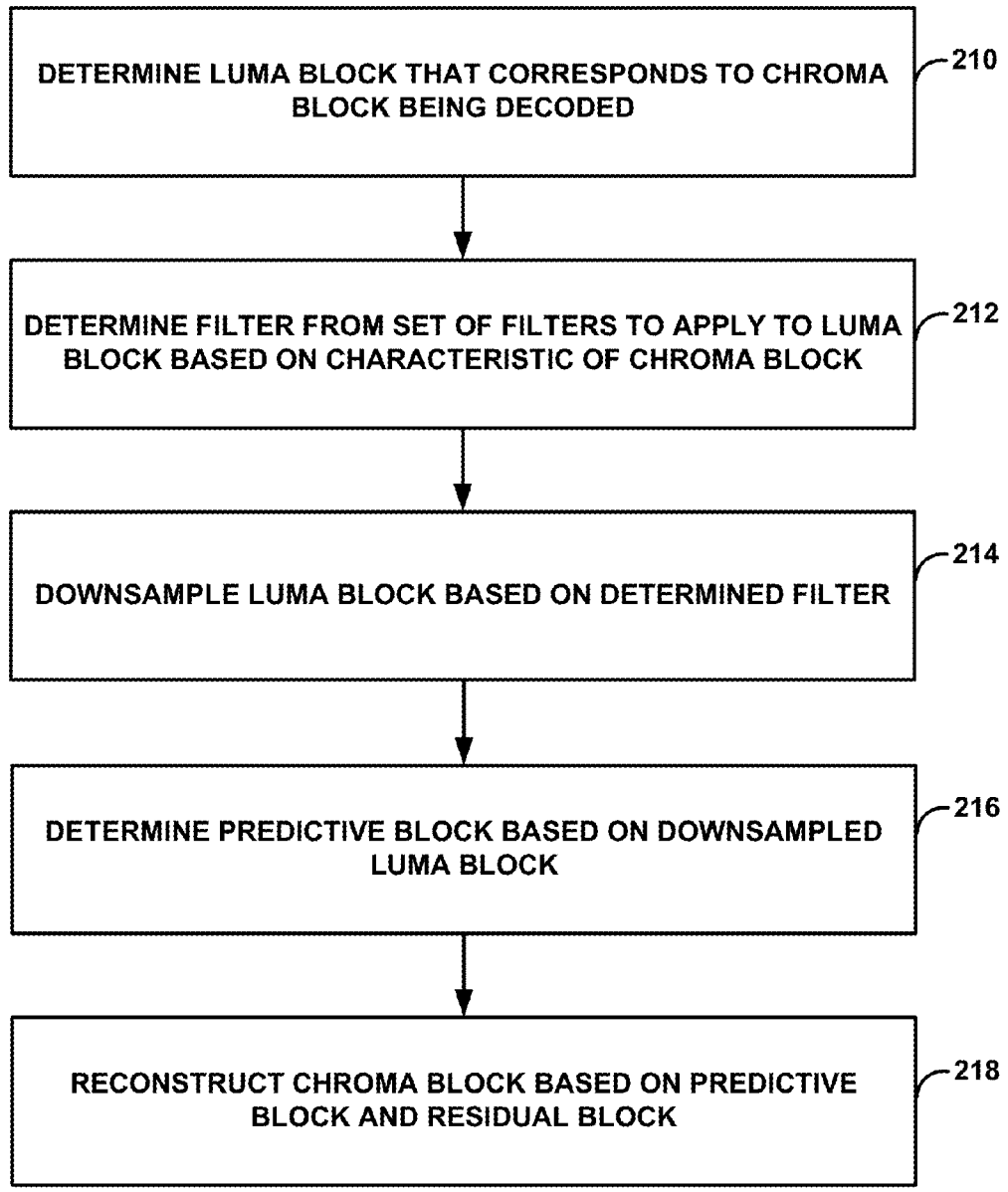
FIG. 9 is a flowchart illustrating one example technique of linear model (LM) prediction decoding video data.

FIG. 9 is a flowchart illustrating one example technique of linear model (LM) prediction decoding video data. As illustrated, LM-based decoding unit 165 determines a luma block of video data that corresponds to a chroma block of video data that is being decoded (210). For example, prediction processing unit 152 receives information indicating the manner in which a picture is divided into CTUs, CUs, and PUs, and constructs the luma blocks and the chroma blocks accordingly, from which LM-based decoding unit 165 can determine which luma block corresponds to which chroma block. In addition, based on the determination of which luma block corresponds to which chroma block, LM-based decoding unit 165 may also determine which luma samples of the luma block correspond to which chroma samples of the chroma block. For instance, in 4:2:0 sampling, four luma samples correspond to one chroma sample.

LM-based decoding unit 165 determines a filter from a set of filters to apply to the luma block based on a characteristic of the chroma block (212). For example, LM-based decoding unit 165 determines to apply a first filter (e.g., two-tap filter) to luma samples of the luma block that correspond to chroma samples of the chroma block that are located at a boundary (e.g., left boundary) of a picture, slice, CU, PU, or TU, where chroma samples located at the boundary are samples located directly on the boundary, adjacent to the boundary, and possibly within a certain number of samples. LM-based decoding unit 165 determines to apply a second filter (e.g., six-tap filter) to luma samples of the luma block that correspond to chroma samples of the chroma block that are not located at the boundary.

LM-based decoding unit 165 downsamples the luma block based on the determined filter (214). For example, to downsample the luma block based on the determined filter, LM-based decoding unit 165 may perform the operations of equation 12 for luma samples of the luma block that correspond to a chroma sample of the chroma block that is at a boundary (e.g., left boundary) of a picture, a slice, CU, PU, or TU, and perform the operations of equation (13) for luma samples of the luma block that correspond to a chroma sample of the chroma block that is not at the boundary of the picture, CU, PU, or TU.

LM-based decoding unit 165 may determine a predictive block based on the downsampled luma block (216). For example, LM-based decoding unit 165 may downsample one or more neighboring luma blocks that neighbor the luma block. However, downsampling of neighboring blocks may not be needed in all examples. LM-based decoding unit 165 may determine a first parameter ($\alpha$) and a second parameter ($\beta$) based on the downsampled one or more neighboring luma blocks and one or more neighboring chroma blocks that neighbor the chroma block being decoded. LM-based decoding unit 165 may determine the predictive block based on the downsampled luma block and the first parameter and the second parameter (e.g., by performing the operations of equation (1)).

Video decoder 30 reconstructs the chroma block based on the predictive block and a residual block (218). Video decoder 30 generates the residual block after entropy decoding, inverse quantizing, and inverse transforming information from the bitstream for the residual block. For example, reconstruction unit 158 sums the predictive block generated by LM prediction with the residual block received from video encoder 20 to reconstruct the decoded chroma block that is stored in DPB 162.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable. In addition, video encoding and video decoding may be generically referred to as "processing" video data.

It should be understood that all of the techniques described herein may be used individually or in combination. This disclosure includes several signaling methods which may change depending on certain factors such as block size, slice type etc. Such variation in signaling or inferring the syntax elements may be known to the encoder and decoder a-priori or may be signaled explicitly in the video parameter set (VPS), sequence parameter set (SPS), picture parameter set (PPS), slice header, at a tile level or elsewhere.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of linear model (LM) prediction decoding video data, the method comprising:
    determining, with a video decoder, a luma block of the video data that corresponds to a chroma block of the video data that is being decoded;
    determining, with the video decoder, a filter from a set of filters to apply to luma samples that are internal to the luma block based on a characteristic of the chroma block, wherein determining the filter to apply comprises:
- determining to apply a first filter to luma samples that are internal to the luma block that correspond to chroma samples of the chroma block that are located at or near a boundary, wherein the boundary comprises a boundary of one of a picture, a slice, a coding unit (CU), a prediction unit (PU), or a transform unit (TU); and
- determining to apply a second filter, different from the first filter, to luma samples that are internal to the luma block that correspond to chroma samples of the chroma block that are not located at or near the boundary;
- downsampling, with the video decoder, the luma samples that are internal to the luma block based on the determined filter to generate a downsampled luma block;
- determining, with the video decoder, parameters based on one or more neighboring luma blocks that neighbor the luma block and one or more neighboring chroma blocks that neighbor the chroma block;
- determining, with the video decoder, a predictive block based on the downsampled luma block and the determined parameters; and
- reconstructing, with the video decoder, the chroma block based on the predictive block and a residual block.

2. The method of claim 1, wherein the boundary comprises one of a left picture boundary, a left slice boundary, a left CU boundary, a left PU boundary, or a left TU boundary.

3. The method of claim 1, wherein the first filter comprises a two-tap filter and the second filter comprises a six-tap filter.

4. The method of claim 1, wherein determining parameters based on one or more neighboring luma blocks that neighbor the luma block and one or more neighboring chroma blocks that neighbor the chroma block comprises:
- downsampling the one or more neighboring luma blocks that neighbor the luma block; and
- determining a first parameter and second parameter based on the downsampled one or more neighboring luma blocks and the one or more neighboring chroma blocks that neighbor the chroma block, and
- wherein determining the predictive block comprises determining the predictive block based on the downsampled luma block and the first parameter and the second parameter.

5. The method of claim 1, wherein the luma block is a first luma block, and the chroma block is a first chroma block, the method further comprising:
- in one instance of a second chroma block, different than the first chroma block, being of a first type, determining to apply a third filter to a second luma block, different than the first luma block, based on the second chroma block being of the first type; and
- in another instance of the second chroma block being of a second type, determining to apply a fourth filter to the second luma block based on the second chroma block being of the second type.

6. The method of claim 1, wherein one or more luma samples of the luma block are outside one or more of the picture, the CU, the PU, or the TU, the method further comprising:
- padding luma sample values for the one or more luma samples that are outside with padding values.

7. The method of claim 1, wherein the luma block comprises a luma residual block, and wherein the chroma block comprises a chroma residual block.

8. A method of linear model (LM) prediction encoding video data, the method comprising:
- determining, with a video encoder, a luma block of the video data that corresponds to a chroma block of the video data that is being encoded;
- determining, with the video encoder, a filter from a set of filters to apply to luma samples that are internal to the luma block based on a characteristic of the chroma block, wherein determining the filter to apply comprises:
  - determining to apply a first filter to luma samples that are internal to the luma block that correspond to chroma samples of the chroma block that are located at or near a boundary, wherein the boundary comprises a boundary of one of a picture, a slice, a coding unit (CU), a prediction unit (PU), or a transform unit (TU); and
  - determining to apply a second filter, different from the first filter, to luma samples that are internal to the luma block that correspond to chroma samples of the chroma block that are not located at or near the boundary;
- downsampling, with the video encoder, the luma samples that are internal to the luma block based on the determined filter to generate a downsampled luma block;
- determining, with the video encoder, parameters based on one or more neighboring luma blocks that neighbor the luma block and one or more neighboring chroma blocks that neighbor the chroma block;
- determining, with the video encoder, a predictive block based on the downsampled luma block and the determined parameters; and
- generating, with the video encoder, a residual block based on the chroma block and the predictive block.

9. The method of claim 8, wherein the boundary comprises one of a left picture boundary, a left slice boundary, a left CU boundary, a left PU boundary, or a left TU boundary.

10. The method of claim 8, wherein the first filter comprises a two-tap filter and the second filter comprises a six-tap filter.

11. The method of claim 8, wherein determining parameters based on one or more neighboring luma blocks that neighbor the luma block and one or more neighboring chroma blocks that neighbor the chroma block comprises:
- downsampling the one or more neighboring luma blocks that neighbor the luma block; and
- determining a first parameter and second parameter based on the downsampled one or more neighboring luma blocks and the one or more neighboring chroma blocks that neighbor the chroma block, and
- wherein determining the predictive block comprises determining the predictive block based on the downsampled luma block and the first parameter and second parameter.

12. The method of claim 8, wherein the luma block is a first luma block, and the chroma block is a first chroma block, the method further comprising:
- in one instance of a second chroma block, different than the first chroma block, being of a first type, determining to apply a third filter to a second luma block, different than the first luma block, based on the second chroma block being of the first type; and in another instance of the second chroma block being of a second type, determining to apply a fourth filter to the second luma block based on the second chroma block being of the second type.

13. The method of claim 8, wherein one or more luma samples of the luma block are outside one or more of the picture, the CU, the PU, or the TU, the method further comprising:
padding luma sample values for the one or more luma samples that are outside with padding values.

14. The method of claim 8, wherein the luma block comprises a luma residual block, and wherein the chroma block comprises a chroma residual block.

15. A device for linear model (LM) prediction decoding video data, the device comprising:
a video data memory configured to store the video data; and
a video decoder comprising integrated circuitry, the video decoder configured to:
determine a luma block of the video data stored in the video data memory that corresponds to a chroma block of video data that is being decoded;
determine a filter from a set of filters to apply to luma samples that are internal to the luma block based on a characteristic of the chroma block, wherein to determine the filter, the video decoder is configured to:
determine to apply a first filter to luma samples that are internal to the luma block that correspond to chroma samples of the chroma block that are located at or near a boundary, wherein the boundary comprises a boundary of one of a picture, a slice, a coding unit (CU), a prediction unit (PU), or a transform unit (TU); and
determine to apply a second filter, different from the first filter, to luma samples that are internal to the luma block that correspond to chroma samples of the chroma block that are not located at or near the boundary;
downsample the luma samples that are internal to the luma block based on the determined filter to generate a downsampled luma block;
determine parameters based on one or more neighboring luma blocks that neighbor the luma block and one or more neighboring chroma blocks that neighbor the chroma block;
determine a predictive block based on the downsampled luma block and the determined parameters; and
reconstruct the chroma block based on the predictive block and a residual block.

16. The device of claim 15, wherein the boundary comprises one of a left picture boundary, a left slice boundary, a left CU boundary, a left PU boundary, or a left TU boundary.

17. The device of claim 15, wherein the first filter comprises a two-tap filter and the second filter comprises a six-tap filter.

18. The device of claim 15, wherein to determine parameters based on one or more neighboring luma blocks that neighbor the luma block and one or more neighboring chroma blocks that neighbor the chroma block, the video decoder is configured to:
downsample the one or more neighboring luma blocks that neighbor the luma block; and
determine a first parameter and second parameter based on the downsampled one or more neighboring luma blocks and the one or more neighboring chroma blocks that neighbor the chroma block, and
wherein to determine the predictive block, the video decoder is configured to determine the predictive block based on the downsampled luma block and the first parameter and the second parameter.

19. The device of claim 15, wherein the luma block is a first luma block, and the chroma block is a first chroma block, and wherein the video decoder is configured to:
in one instance of a second chroma block, different than the first chroma block, being of a first type, determine to apply a third filter to a second luma block, different than the first luma block, based on the second chroma block being of the first type; and
in another instance of the second chroma block being of a second type, determine to apply a fourth filter to the second luma block based on the second chroma block being of the second type.

20. The device of claim 15, wherein one or more luma samples of the luma block are outside one or more of the picture, the CU, the PU, or the TU, the video decoder is configured to:
pad luma sample values for the one or more luma samples that are outside with padding values.

21. The device of claim 15, wherein the luma block comprises a luma residual block, and wherein the chroma block comprises a chroma residual block.

22. A device for linear model (LM) prediction encoding video data, the device comprising:
a video data memory configured to store the video data; and
a video encoder comprising integrated circuitry, the video encoder configured to:
determine a luma block of the video data stored in the video data memory that corresponds to a chroma block of the video data that is being encoded;
determine a filter from a set of filters to apply to luma samples that are internal to the luma block based on a characteristic of the chroma block, wherein to determine the filter, the video encoder is configured to:
determine to apply a first filter to luma samples that are internal to the luma block that correspond to chroma samples of the chroma block that are located at or near a boundary, wherein the boundary comprises a boundary of one of a picture, a slice, a coding unit (CU), a prediction unit (PU), or a transform unit (TU); and
determine to apply a second filter, different from the first filter, to luma samples that are internal to the luma block that correspond to chroma samples of the chroma block that are not located at or near the boundary;
downsample the luma samples that are internal to the luma block based on the determined filter to generate a downsampled luma block;
determine parameters based on one or more neighboring luma blocks that neighbor the luma block and one or more neighboring chroma blocks that neighbor the chroma block;
determine a predictive block based on the downsampled luma block and the determined parameters; and
generate a residual block based on the chroma block and the predictive block.

23. The device of claim 22, wherein the boundary comprises one of a left picture boundary, a left slice boundary, a left CU boundary, a left PU boundary, or a left TU boundary.

24. The device of claim 22, wherein the first filter comprises a two-tap filter and the second filter comprises a six-tap filter.

25. A device for linear model (LM) prediction decoding video data, the device comprising:
    means for determining a luma block of the video data that corresponds to a chroma block of the video data that is being decoded;
    means for determining a filter from a set of filters to apply to luma samples that are internal to the luma block based on a characteristic of the chroma block, wherein the means for determining the filter to apply comprises:
        means for determining to apply a first filter to luma samples that are internal to the luma block that correspond to chroma samples of the chroma block that are located at or near a boundary, wherein the boundary comprises a boundary of one of a picture, a slice, a coding unit (CU), a prediction unit (PU), or a transform unit (TU); and
        means for determining to apply a second filter, different from the first filter, to luma samples that are internal to the luma block that correspond to chroma samples of the chroma block that are not located at or near the boundary;
    means for downsampling the luma samples that are internal to the luma block based on the determined filter to generate a downsampled luma block;
    means for determining parameters based on one or more neighboring luma blocks that neighbor the luma block and one or more neighboring chroma blocks that neighbor the chroma block:
    means for determining a predictive block based on the downsampled luma block and the determined parameters; and
    means for reconstructing the chroma block based on the predictive block and a residual block.

26. The device of claim 25, wherein the boundary comprises one of a left picture boundary, a left slice boundary, a left CU boundary, a left PU boundary, or a left TU boundary.

27. The device of claim 25, wherein the first filter comprises a two-tap filter and the second filter comprises a six-tap filter.

28. A device for linear model (LM) prediction encoding video data, the device comprising:
    means for determining a luma block of the video data that corresponds to a chroma block of the video data that is being encoded;
    means for determining a filter from a set of filters to apply to luma samples that are internal to the luma block based on a characteristic of the chroma block, wherein the means for determining the filter to apply comprises:
        means for determining to apply a first filter to luma samples that are internal to the luma block that correspond to chroma samples of the chroma block that are located at or near a boundary, wherein the boundary comprises a boundary of one of a picture, a slice, a coding unit (CU), a prediction unit (PU), or a transform unit (TU); and
        means for determining to apply a second filter, different from the first filter, to luma samples that are internal to the luma block that correspond to chroma samples of the chroma block that are not located at or near the boundary;
    means for downsampling the luma samples that are internal to the luma block based on the determined filter to generate a downsampled luma block;
    means for determining parameters based on one or more neighboring luma blocks that neighbor the luma block and one or more neighboring chroma blocks that neighbor the chroma block:
    means for determining a predictive block based on the downsampled luma block and the determined parameters; and
    means for generating a residual block based on the chroma block and the predictive block.

29. The device of claim 28, wherein the boundary comprises one of a left picture boundary, a left slice boundary, a left CU boundary, a left PU boundary, or a left TU boundary.

30. The device of claim 28, wherein the first filter comprises a two-tap filter and the second filter comprises a six-tap filter.

31. A non-transitory computer-readable storage medium storing instructions that when executed cause one or more processors of a device for linear model (LM) prediction decoding video data to:
    determine a luma block of the video data that corresponds to a chroma block of the video data that is being decoded;
    determine a filter from a set of filters to apply to luma samples that are internal to the luma block based on a characteristic of the chroma block, wherein the instructions that cause the one or more processors to determine the filter to apply comprise instructions that cause the one or more processors to:
        determine to apply a first filter to luma samples that are internal to the luma block that correspond to chroma samples of the chroma block that are located at or near a boundary, wherein the boundary comprises a boundary of one of a picture, a slice, a coding unit (CU), a prediction unit (PU), or a transform unit (TU); and
        determine to apply a second filter, different from the first filter, to luma samples that are internal to the luma block that correspond to chroma samples of the chroma block that are not located at or near the boundary;
    downsample the luma samples that are internal to the luma block based on the determined filter to generate a downsampled luma block;
    determine parameters based on one or more neighboring luma blocks that neighbor the luma block and one or more neighboring chroma blocks that neighbor the chroma block;
    determine a predictive block based on the downsampled luma block and the determined parameters; and
    reconstruct the chroma block based on the predictive block and a residual block.

32. A non-transitory computer-readable storage medium storing instructions that when executed cause one or more processors of a device for linear model (LM) prediction encoding video data to:
    determine a luma block of the video data that corresponds to a chroma block of the video data that is being encoded;
    determine a filter from a set of filters to apply to luma samples that are internal to the luma block based on a characteristic of the chroma block, wherein the instructions that cause the one or more processors to determine the filter to apply comprise instructions that cause the one or more processors to:
  determine to apply a first filter to luma samples that are internal to the luma block that correspond to chroma samples of the chroma block that are located at or near a boundary, wherein the boundary comprises a boundary of one of a picture, a slice, a coding unit (CU), a prediction unit (PU), or a transform unit (TU); and
  determine to apply a second filter, different from the first filter, to luma samples that are internal to the luma block that correspond to chroma samples of the chroma block that are not located at or near the boundary;
  downsample the luma samples that are internal to the luma block based on the determined filter to generate a downsampled luma block;
  determine parameters based on one or more neighboring luma blocks that neighbor the luma block and one or more neighboring chroma blocks that neighbor the chroma block;
  determine a predictive block based on the downsampled luma block and the determined parameters; and
  generate a residual block based on the chroma block and the predictive block.

33. The method of claim 1, wherein determining to apply a first filter to luma samples that are internal to the luma block comprises determining to apply a first filter to luma samples that are of the luma block.

34. The method of claim 1, wherein determining to apply a first filter to luma samples that are internal to the luma block that correspond to chroma samples of the block that are located at or near a boundary comprises determining to apply a first filter to luma samples that are internal to the luma block that correspond to chroma samples of the block that are closest to the boundary including chroma samples that are directly on the boundary.

35. The method of claim 1, wherein determining to apply a second filter, different from the first filter, to luma samples that are internal to the luma block that correspond to chroma samples of the block that are not located at or near the boundary comprises determining to apply a second filter, different from the first filter, to luma samples that are internal to the luma block that correspond to chroma samples of the block that are not closest to the boundary including chroma samples that are not directly on the boundary.

36. The method of claim 8, wherein determining to apply a first filter to luma samples that are internal to the luma block comprises determining to apply a first filter to luma samples that are of the luma block.

37. The method of claim 8,
  wherein determining to apply a first filter to luma samples that are internal to the luma block that correspond to chroma samples of the block that are located at or near a boundary comprises determining to apply a first filter to luma samples that are internal to the luma block that correspond to chroma samples of the block that are closest to the boundary including chroma samples that are directly on the boundary, and
  wherein determining to apply a second filter, different from the first filter, to luma samples that are internal to the luma block that correspond to chroma samples of the block that are not located at or near the boundary comprises determining to apply a second filter, different from the first filter, to luma samples that are internal to the luma block that correspond to chroma samples of the block that are not closest to the boundary including chroma samples that are not directly on the boundary.

38. The device of claim 15, wherein to determine to apply a first filter to luma samples that are internal to the luma block, the video decoder is configured to determine to apply a first filter to luma samples that are of the luma block.

39. The device of claim 15, wherein to determine to apply a first filter to luma samples that are internal to the luma block that correspond to chroma samples of the block that are located at or near a boundary, the video decoder is configured to determine to apply a first filter to luma samples that are internal to the luma block that correspond to chroma samples of the block that are closest to the boundary including chroma samples that are directly on the boundary.

40. The device of claim 15, wherein to determine to apply a second filter, different from the first filter, to luma samples that are internal to the luma block that correspond to chroma samples of the block that are not located at or near the boundary, the video decoder is configured to determine to apply a second filter, different from the first filter, to luma samples that are internal to the luma block that correspond to chroma samples of the block that are not closest to the boundary including chroma samples that are not directly on the boundary.

41. The device of claim 22, wherein to determine to apply a first filter to luma samples that are internal to the luma block, the video encoder is configured to determine to apply a first filter to luma samples that are of the luma block.

42. The device of claim 22,
  wherein to determine to apply a first filter to luma samples that are internal to the luma block that correspond to chroma samples of the block that are located at or near a boundary, the video encoder is configured to determine to apply a first filter to luma samples that are internal to the luma block that correspond to chroma samples of the block that are closest to the boundary including chroma samples that are directly on the boundary, and
  wherein to determine to apply a second filter, different from the first filter, to luma samples that are internal to the luma block that correspond to chroma samples of the block that are not located at or near the boundary, the video encoder is configured to determine to apply a second filter, different from the first filter, to luma samples that are internal to the luma block that correspond to chroma samples of the block that are not closest to the boundary including chroma samples that are not directly on the boundary.

43. The device of claim 25, wherein the means for determining to apply a first filter to luma samples that are internal to the luma block comprises means for determining to apply a first filter that are of the luma block.

44. The device of claim 25, wherein the means for determining to apply a first filter to luma samples that are internal to the luma block that correspond to chroma samples of the block that are located at or near a boundary comprises means for determining to apply a first filter to luma samples that are internal to the luma block that correspond to chroma samples of the block that are closest to the boundary including chroma samples that are directly on the boundary.

45. The device of claim 25, wherein the means for determining to apply a second filter, different from the first filter, to luma samples that are internal to the luma block that correspond to chroma samples of the block that are not located at or near the boundary comprises means for determining to apply a second filter, different from the first filter, to luma samples that are internal to the luma block that correspond to chroma samples of the block that are not closest to the boundary including chroma samples that are not directly on the boundary.

46. The non-transitory computer-readable storage medium of claim 31, wherein the instructions that cause the one or more processors to determine to apply a first filter to luma samples that are internal to the luma block comprise instructions that cause the one or more processors to determine to apply a first filter that are of the luma block.

47. The non-transitory computer-readable storage medium of claim 31,
    wherein the instructions that cause the one or more processors to determine to apply a first filter to luma samples that are internal to the luma block that correspond to chroma samples of the block that are located at or near a boundary comprise instructions that cause the one or more processors to determine to apply a first filter to luma samples that are internal to the luma block that correspond to chroma samples of the block that are closest to the boundary including chroma samples that are directly on the boundary, and
    wherein the instructions that cause the one or more processors to determine to apply a second filter, different from the first filter, to luma samples that are internal to the luma block that correspond to chroma samples of the block that are not located at or near the boundary comprise instructions that cause the one or more processors to determine to apply a second filter, different from the first filter, to luma samples that are internal to the luma block that correspond to chroma samples of the block that are not closest to the boundary including chroma samples that are not directly on the boundary.

\* \* \* \* \*